US011354750B1

(12) United States Patent
Roll et al.

(10) Patent No.: US 11,354,750 B1
(45) Date of Patent: Jun. 7, 2022

(54) BLOCKCHAIN SYSTEMS AND METHODS FOR PROVIDING INSURANCE COVERAGE TO AFFINITY GROUPS

(71) Applicant: STATE FARM MUTUAL AUTOMOBILE INSURANCE COMPANY, Bloomington, IL (US)

(72) Inventors: Leif Agerholm Roll, Bloomington, IL (US); Eric Webster, Bloomington, IL (US); Gregory Hayward, Bloomington, IL (US); Craig Dean Isaacs, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 101 days.

(21) Appl. No.: 16/853,711

(22) Filed: Apr. 20, 2020

Related U.S. Application Data

(63) Continuation of application No. 15/869,752, filed on Jan. 12, 2018, now Pat. No. 10,664,920, which is a
(Continued)

(51) Int. Cl.
*G06Q 40/08* (2012.01)
*G06Q 30/08* (2012.01)
*G06Q 10/10* (2012.01)

(52) U.S. Cl.
CPC ............. *G06Q 40/08* (2013.01); *G06Q 10/10* (2013.01); *G06Q 30/08* (2013.01); *H04L 2209/38* (2013.01)

(58) Field of Classification Search
CPC ........ G06Q 40/08; G06Q 10/10; G06Q 30/08; H04L 2209/38
(Continued)

(56) References Cited

U.S. PATENT DOCUMENTS 5,794,207 A    8/1998 Walker et al.
5,797,134 A    8/1998 McMillan et al.
(Continued)

FOREIGN PATENT DOCUMENTS

CN    106663281 A    5/2017
GB      2517964 A    3/2015
(Continued)

OTHER PUBLICATIONS

McLeod, "Surplus lines insurers begin to make use of Web", Business Insurance 34.37: 4-6,, Crain Communications, Incorporated, Proquest Doc, Id: 233533754, Sep. 2000.*
(Continued)

*Primary Examiner* — Frantzy Poinvil
(74) *Attorney, Agent, or Firm* — Marshall, Gerstein & Borun LLP

(57) ABSTRACT

Blockchain techniques for providing insurance to an affinity group may include an enforcement server that receives a plurality of bidding actions (e.g., bid or no-bid) from a plurality of bidding entities in response to an auction of an opportunity to provide insurance for members of the affinity group. The server may compile transactions corresponding to the received bidding actions into a block of transactions (e.g., a round of bidding), distribute the block of transactions to validation entities to form a consensus on the highest bid, and update copies of a distributed ledger with the block of transactions. The server may identify a winning bid and provide affinity group member data to the winning bidding entity, thereby providing consumers with lower cost insurance and/or insurance that is more reflective of actual risk (or lack thereof). The affinity group may be updated over time and re-auctioned using the blockchain techniques.

13 Claims, 10 Drawing Sheets

Related U.S. Application Data continuation-in-part of application No. 14/871,401, filed on Sep. 30, 2015, now Pat. No. 10,510,120.

(60) Provisional application No. 62/503,184, filed on May 8, 2017, provisional application No. 62/485,725, filed on Apr. 14, 2017, provisional application No. 62/471,224, filed on Mar. 14, 2017, provisional application No. 62/199,008, filed on Jul. 30, 2015, provisional application No. 62/189,885, filed on Jul. 8, 2015, provisional application No. 62/104,596, filed on Jan. 16, 2015, provisional application No. 62/060,080, filed on Oct. 6, 2014.

(58) Field of Classification Search
USPC .................................................. 705/3–44
See application file for complete search history.

(56) References Cited

U.S. PATENT DOCUMENTS

| | | |
|---|---|---|
| 5,845,255 A | 12/1998 | Mayaud |
| 6,085,169 A | 7/2000 | Walker et al. |
| 6,101,484 A | 8/2000 | Halbert et al. |
| 6,418,415 B1 | 7/2002 | Walker et al. |
| 7,107,230 B1 | 9/2006 | Halbert et al. |
| 7,194,427 B1 | 3/2007 | Van Horn et al. |
| 7,330,826 B1 | 2/2008 | Porat et al. |
| 7,343,309 B2 | 3/2008 | Ogawa et al. |
| 7,403,911 B2 | 7/2008 | Guler et al. |
| 7,490,050 B2 | 2/2009 | Grover et al. |
| 7,558,752 B1 | 7/2009 | Ephrati et al. |
| 7,584,124 B2 | 9/2009 | Porat et al. |
| 7,610,236 B2 | 10/2009 | Sandholm et al. |
| 7,685,008 B2 | 3/2010 | McGiffin et al. |
| 7,685,046 B2 * | 3/2010 | Wallman ............... G06Q 40/10 705/36 R |
| 7,720,743 B1 | 5/2010 | Marks |
| 7,797,194 B1 | 9/2010 | Friss et al. |
| 7,904,378 B2 | 3/2011 | Ghani et al. |
| 7,937,278 B1 | 5/2011 | Cripe et al. |
| 7,958,013 B2 | 6/2011 | Porat et al. |
| 7,979,341 B2 | 7/2011 | Hanifi |
| 7,996,296 B2 | 8/2011 | Lange |
| 8,024,203 B2 * | 9/2011 | Kendall ............... G06Q 30/02 705/4 |
| 8,068,475 B2 | 11/2011 | Iochi et al. |
| 8,095,399 B2 | 1/2012 | McConnell et al. |
| 8,103,577 B2 | 1/2012 | Sakaue et al. |
| 8,117,112 B2 | 2/2012 | Hambrecht et al. |
| 8,126,794 B2 | 2/2012 | Lange et al. |
| 8,176,145 B1 * | 5/2012 | Stender ............... G06Q 40/08 709/219 |
| 8,190,454 B2 | 5/2012 | Chien et al. |
| 8,219,423 B2 | 7/2012 | Hersch |
| 8,251,702 B2 | 8/2012 | Marks |
| 8,275,640 B2 | 9/2012 | Jayaram et al. |
| 8,296,191 B1 | 10/2012 | Foo et al. |
| 8,301,544 B2 | 10/2012 | Chatter et al. |
| 8,306,869 B2 | 11/2012 | Ford |
| 8,315,891 B2 | 11/2012 | Kendall et al. |
| 8,332,244 B1 | 12/2012 | Karam et al. |
| 8,335,701 B1 | 12/2012 | Syed et al. |
| 8,341,033 B2 | 12/2012 | Porat et al. |
| 8,433,588 B2 | 4/2013 | Willis et al. |
| 8,515,777 B1 | 8/2013 | Rajasenan |
| 8,521,567 B2 | 8/2013 | Varanasi et al. |
| 8,527,302 B2 | 9/2013 | Johnson, Jr. et al. |
| 8,543,430 B1 | 9/2013 | Fields et al. |
| 8,545,229 B2 | 10/2013 | Marks |
| 8,577,699 B1 | 11/2013 | Diener et al. |
| 8,577,703 B2 | 11/2013 | McClellan et al. |
| 8,595,102 B1 * | 11/2013 | Burdette ............... G06Q 40/06 705/35 |
| 8,612,266 B1 | 12/2013 | Ilgenfritz |
| 8,630,916 B2 | 1/2014 | Walker et al. |
| 8,635,093 B2 * | 1/2014 | Kendall ............... G06Q 30/02 705/4 |
| 8,639,535 B1 * | 1/2014 | Kazenas ............... G06Q 40/00 705/4 |
| 8,666,786 B1 | 3/2014 | Wirz et al. |
| 8,666,788 B1 | 3/2014 | Syed |
| 8,706,531 B1 | 4/2014 | Voigt et al. |
| 8,719,063 B1 | 5/2014 | Wade et al. |
| 8,738,463 B2 | 5/2014 | Porat et al. |
| 8,744,881 B2 | 6/2014 | Reid |
| 8,799,125 B2 | 8/2014 | Schumann, Jr. |
| 8,818,618 B2 | 8/2014 | Follmer et al. |
| 8,849,803 B2 | 9/2014 | Grabau et al. |
| 9,037,394 B2 | 5/2015 | Fernandes et al. |
| 9,053,469 B1 | 6/2015 | Bohanek et al. |
| 9,269,109 B2 | 2/2016 | Berg et al. |
| 9,293,042 B1 | 3/2016 | Wasserman |
| 9,558,598 B2 | 1/2017 | Doughty et al. |
| 9,715,711 B1 | 7/2017 | Konrardy et al. |
| 9,849,364 B2 | 12/2017 | Tran et al. |
| 9,898,759 B2 | 2/2018 | Khoury |
| 9,940,676 B1 | 4/2018 | Biemer |
| 9,953,372 B1 | 4/2018 | Dziabiak et al. |
| 9,972,053 B2 * | 5/2018 | Denning ............... G06Q 40/08 |
| 9,996,882 B1 | 6/2018 | Manzella et al. |
| 9,996,884 B2 | 6/2018 | Collopy et al. |
| 10,062,118 B1 | 8/2018 | Bernstein et al. |
| 10,109,014 B1 | 10/2018 | Bischoff et al. |
| 10,192,265 B2 | 1/2019 | Carragher |
| 10,346,925 B2 | 7/2019 | Perl et al. |
| 10,380,693 B2 | 8/2019 | Suiter |
| 10,430,883 B1 | 10/2019 | Bischoff et al. |
| 10,467,703 B2 | 11/2019 | Olson |
| 10,475,126 B1 | 11/2019 | Clegg et al. |
| 10,489,798 B1 | 11/2019 | Madeyski |
| 10,505,726 B1 * | 12/2019 | Andon ............... G06Q 30/016 |
| 10,510,120 B1 | 12/2019 | Roll |
| 10,540,723 B1 | 1/2020 | Potter et al. |
| 10,664,920 B1 * | 5/2020 | Roll ............... G06Q 30/08 |
| 10,713,718 B2 | 7/2020 | Roll et al. |
| 10,713,728 B1 * | 7/2020 | Roll ............... G06Q 10/10 |
| 10,817,949 B1 | 10/2020 | Wieduwilt et al. |
| 10,949,928 B1 * | 3/2021 | Roll ............... G06Q 40/08 |
| 2001/0004204 A1 | 6/2001 | Mitsuaki |
| 2001/0037281 A1 | 11/2001 | French et al. |
| 2001/0042041 A1 | 11/2001 | Moshal et al. |
| 2001/0056396 A1 | 12/2001 | Goino |
| 2002/0029158 A1 | 3/2002 | Wolff et al. |
| 2002/0042769 A1 | 4/2002 | Gujral et al. |
| 2002/0046067 A1 | 4/2002 | Kraehenbuehl et al. |
| 2002/0111835 A1 | 8/2002 | Hele et al. |
| 2002/0194033 A1 | 12/2002 | Huff |
| 2003/0023492 A1 | 1/2003 | Riordan et al. |
| 2003/0050901 A1 | 3/2003 | Jester et al. |
| 2003/0069759 A1 | 4/2003 | Smith |
| 2003/0093355 A1 | 5/2003 | Issa |
| 2003/0182222 A1 | 9/2003 | Rotman et al. |
| 2003/0191672 A1 | 10/2003 | Kendall et al. |
| 2003/0220878 A1 * | 11/2003 | Degen ............... G06Q 20/4016 705/50 |
| 2003/0233260 A1 | 12/2003 | Snell et al. |
| 2003/0236682 A1 | 12/2003 | Heyer |
| 2003/0236738 A1 | 12/2003 | Lange et al. |
| 2004/0010426 A1 | 1/2004 | Berdou |
| 2004/0186755 A1 | 9/2004 | Roche |
| 2005/0055299 A1 | 3/2005 | Chambers et al. |
| 2005/0071203 A1 | 3/2005 | Maus |
| 2005/0075910 A1 | 4/2005 | Solanki et al. |
| 2005/0119580 A1 | 6/2005 | Eveland |
| 2005/0199580 A1 | 9/2005 | Yang et al. |
| 2005/0261939 A1 | 11/2005 | Augspurger et al. |
| 2005/0278199 A1 | 12/2005 | Ghani |
| 2006/0017897 A1 | 1/2006 | Sato |
| 2006/0041500 A1 | 2/2006 | Diana et al. |
| 2006/0053037 A1 * | 3/2006 | Kendall ............... G06Q 40/08 705/4 |
| 2006/0055037 A1 | 3/2006 | Park et al. |
| 2006/0136324 A1 | 6/2006 | Barry et al. |

(56) References Cited

U.S. PATENT DOCUMENTS

| | | |
|---|---|---|
| 2006/0178979 A1 | 8/2006 | Levine et al. |
| 2006/0241982 A1 | 10/2006 | Seifert et al. |
| 2006/0253366 A1 | 11/2006 | Rebibo |
| 2006/0265259 A1 | 11/2006 | Diana et al. |
| 2007/0226014 A1 | 9/2007 | Alemayehu et al. |
| 2007/0262140 A1 | 11/2007 | Long |
| 2007/0288262 A1 | 12/2007 | Sakaue et al. |
| 2008/0052111 A1 | 2/2008 | McMenimen et al. |
| 2008/0154694 A1 | 6/2008 | Litzow et al. |
| 2009/0024419 A1 | 1/2009 | McClellan et al. |
| 2009/0037228 A1 | 2/2009 | Engel |
| 2009/0055226 A1 | 2/2009 | Tritz et al. |
| 2009/0099877 A1 | 4/2009 | Hyde et al. |
| 2009/0171831 A1 | 7/2009 | Johnson, Jr. et al. |
| 2009/0182585 A1 | 7/2009 | Harkensee et al. |
| 2009/0228308 A1 | 9/2009 | Chien et al. |
| 2009/0254971 A1 | 10/2009 | Herz et al. |
| 2010/0014573 A1 | 1/2010 | Momtaz et al. |
| 2010/0131284 A1 | 5/2010 | Duffy |
| 2010/0145735 A1* | 6/2010 | Kendall ............... G06Q 40/08 705/4 |
| 2010/0198658 A1 | 8/2010 | Marks |
| 2010/0235242 A1 | 9/2010 | Firminger et al. |
| 2011/0016687 A1 | 1/2011 | Xia |
| 2011/0021369 A1 | 1/2011 | Mhlanga et al. |
| 2011/0022417 A1 | 1/2011 | Rao |
| 2011/0047070 A1* | 2/2011 | Farias ................... G06Q 40/02 705/38 |
| 2011/0137730 A1 | 6/2011 | McCarney et al. |
| 2011/0161100 A1 | 6/2011 | Peak et al. |
| 2011/0161168 A1 | 6/2011 | Dubnicki |
| 2011/0166875 A1 | 7/2011 | Hayter et al. |
| 2011/0184250 A1 | 7/2011 | Schmidt et al. |
| 2011/0213628 A1 | 9/2011 | Peak et al. |
| 2011/0213693 A1 | 9/2011 | Kendall et al. |
| 2012/0010906 A1 | 1/2012 | Foladare et al. |
| 2012/0016692 A1 | 1/2012 | Jenkins-Robbins |
| 2012/0066007 A1 | 3/2012 | Ferrick et al. |
| 2012/0078698 A1 | 3/2012 | Pappas et al. |
| 2012/0109692 A1 | 5/2012 | Collins et al. |
| 2012/0123806 A1 | 5/2012 | Schumann, Jr. et al. |
| 2012/0123891 A1 | 5/2012 | Patel |
| 2012/0166228 A1 | 6/2012 | Singleton et al. |
| 2012/0179481 A1 | 7/2012 | Patel et al. |
| 2012/0179482 A1 | 7/2012 | Garms et al. |
| 2012/0209743 A1 | 8/2012 | Mesaros |
| 2012/0232935 A1 | 9/2012 | Voccola |
| 2012/0239438 A1 | 9/2012 | Hemmings et al. |
| 2012/0278112 A1 | 11/2012 | Hersch |
| 2012/0323697 A1 | 12/2012 | Marks |
| 2013/0066656 A1 | 3/2013 | Hanson et al. |
| 2013/0090950 A1 | 4/2013 | Rao |
| 2013/0096956 A1 | 4/2013 | Saidel et al. |
| 2013/0117048 A1 | 5/2013 | Bradshaw et al. |
| 2013/0117049 A1 | 5/2013 | Kendall et al. |
| 2013/0151274 A1 | 6/2013 | Bage et al. |
| 2013/0166313 A1 | 6/2013 | Kitfield et al. |
| 2013/0179188 A1 | 7/2013 | Hyde et al. |
| 2013/0246151 A1* | 9/2013 | Raghavan ........... G06Q 30/0226 705/14.27 |
| 2013/0304499 A1 | 11/2013 | Rangadass |
| 2013/0311208 A1 | 11/2013 | Lutnick et al. |
| 2013/0328671 A1 | 12/2013 | McKown et al. |
| 2013/0339065 A1 | 12/2013 | Denning et al. |
| 2014/0006128 A1* | 1/2014 | Grigg ................. G06Q 30/0253 705/14.23 |
| 2014/0033243 A1 | 1/2014 | Chen et al. |
| 2014/0058759 A1 | 2/2014 | Hersch |
| 2014/0067472 A1 | 3/2014 | Mayes et al. |
| 2014/0081670 A1 | 3/2014 | Lim et al. |
| 2014/0114697 A1* | 4/2014 | Denning ................ G06Q 50/01 705/4 |
| 2014/0114702 A1* | 4/2014 | Grosso ................. G06Q 40/06 705/4 |
| 2014/0136237 A1 | 5/2014 | Anderson et al. |
| 2014/0136443 A1 | 5/2014 | Kinsey, II et al. |
| 2014/0142987 A1 | 5/2014 | Misch et al. |
| 2014/0149148 A1 | 5/2014 | Luciani |
| 2014/0156314 A1 | 6/2014 | Gunn |
| 2014/0161721 A1 | 6/2014 | Hatchwell et al. |
| 2014/0164188 A1 | 6/2014 | Zabawa et al. |
| 2014/0172466 A1 | 6/2014 | Kemp et al. |
| 2014/0172469 A1 | 6/2014 | Kendall et al. |
| 2014/0188525 A1* | 7/2014 | Kendall ................ G06Q 40/08 705/4 |
| 2014/0222469 A1 | 8/2014 | Stahl et al. |
| 2014/0229402 A1 | 8/2014 | Caron |
| 2014/0244275 A1 | 8/2014 | Parthasarathy |
| 2014/0257047 A1 | 9/2014 | Sillay et al. |
| 2014/0257863 A1 | 9/2014 | Maastricht et al. |
| 2014/0278577 A1 | 9/2014 | Baum et al. |
| 2014/0358592 A1 | 12/2014 | Wedig et al. |
| 2014/0372151 A1 | 12/2014 | Karamchedu et al. |
| 2014/0372228 A1* | 12/2014 | Paz-Pujalt ........ G06Q 30/0271 705/14.67 |
| 2015/0016173 A1 | 1/2015 | Liaw |
| 2015/0025917 A1 | 1/2015 | Stempora |
| 2015/0066543 A1 | 3/2015 | Dubens |
| 2015/0066727 A1 | 3/2015 | Wepsic et al. |
| 2015/0066740 A1 | 3/2015 | DiCarlo |
| 2015/0081329 A1 | 3/2015 | Saidel et al. |
| 2015/0100437 A1 | 4/2015 | Guo et al. |
| 2015/0127357 A1 | 5/2015 | Yuan et al. |
| 2015/0134344 A1 | 5/2015 | Turrentine et al. |
| 2015/0161738 A1 | 6/2015 | Stempora |
| 2015/0170287 A1 | 6/2015 | Tirone et al. |
| 2015/0172894 A1 | 6/2015 | Gabel |
| 2015/0187016 A1 | 7/2015 | Adams et al. |
| 2015/0187019 A1 | 7/2015 | Fernandes et al. |
| 2015/0206248 A1 | 7/2015 | Kornweibel et al. |
| 2015/0269681 A1 | 9/2015 | Kalinadhabhotla |
| 2015/0278855 A1 | 10/2015 | Khoury |
| 2015/0286784 A1 | 10/2015 | Hagigi et al. |
| 2015/0294420 A1 | 10/2015 | Hu |
| 2015/0324920 A1 | 11/2015 | Wilson et al. |
| 2016/0034668 A1 | 2/2016 | Rourke et al. |
| 2016/0098788 A1 | 4/2016 | Wang |
| 2016/0203278 A1 | 7/2016 | Shoemaker |
| 2016/0217512 A1 | 7/2016 | Majumdar et al. |
| 2016/0217532 A1 | 7/2016 | Slavin |
| 2016/0260175 A1 | 9/2016 | Rogers |
| 2016/0283962 A1 | 9/2016 | Chan et al. |
| 2016/0283987 A1 | 9/2016 | Nishimura |
| 2016/0314524 A1 | 10/2016 | Trindade de Sousa Monteiro |
| 2016/0335726 A1 | 11/2016 | Bonitz et al. |
| 2016/0371783 A1 | 12/2016 | Lohrmann |
| 2016/0371787 A1 | 12/2016 | Rackley, III et al. |
| 2016/0371788 A1 | 12/2016 | Rackley, III et al. |
| 2017/0061084 A1 | 3/2017 | Pandya |
| 2017/0212997 A1 | 7/2017 | Buonfiglio et al. |
| 2017/0255966 A1 | 9/2017 | Khoury |
| 2018/0225770 A1 | 8/2018 | Rixford |
| 2018/0336640 A1 | 11/2018 | Dziabiak et al. |
| 2019/0220930 A1 | 7/2019 | Clark et al. |
| 2020/0294128 A1* | 9/2020 | Celia .................... H04L 9/0637 |
| 2021/0166320 A1* | 6/2021 | Roll ..................... G06Q 40/08 |

FOREIGN PATENT DOCUMENTS

| | | |
|---|---|---|
| JP | 2001-202473 A | 7/2001 |
| JP | 2012-003297 A | 1/2012 |
| JP | 2014-149882 A | 8/2014 |
| JP | 2016-134148 A | 7/2016 |
| KR | 20010087072 A | 9/2001 |
| KR | 20010091149 A | 10/2001 |
| KR | 20010091174 A | 10/2001 |
| KR | 20010098293 A | 11/2001 |
| KR | 20010104433 A | 11/2001 |
| KR | 20010104473 A | 11/2001 |
| KR | 20020008996 A | 2/2002 |
| KR | 20030016544 A | 3/2003 |
| KR | 101810179 B1 | 12/2017 |
| KR | 101823015 B1 | 1/2018 |

(56) References Cited

FOREIGN PATENT DOCUMENTS

| KR | 20190071065 A | 6/2019 |
| TW | 200903372 A | 1/2009 |
| WO | WO-02/03595 A2 | 1/2002 |
| WO | WO-2017/168883 A1 | 10/2017 |

OTHER PUBLICATIONS

"Assessing the Risks of Insuring Reputation Risk", Gatzert et al., Journal of Risk and Insurance, vol. 83, No. 3, 641-679 (2016) (Year 2015).
"Find Reliable Auto Insurance Agencies Online by Comparing Free Quotes!", PR Newswire (Mar. 3, 2017).
"Free Diagnostics? $29 Service Call?", Greenleaf Mechanical, downloaded from the Internet at: <https://www.greenleafheatingandcooling.com/free-diagnostics-service/> (Jul. 29, 2012).
"ReviMedia, Inc.; ReviMedia Re-vamps Insurance Quote Website BestQuotes.com", Insurance Business Weekly (Aug. 31, 2014).
"Signing Bonus", Wikipedia entry, downloaded from the Internet at: <https://en.wikipedia.org/w/index.php?title=Signing_bonus@oldid=476735612> (2012).
TransUnion Enters Online Auto Insurance Marketplace with the Launch of Quote Exchange, IntenretWire (May 16, 2016).
"Use Online Auto Insurance Quotes to Review the Best Agencies in Your Area!" PR Newswire (May 6, 2016).
Douglass, Auction Rate Securities . . . Going Once, Going Twice, New Jersey CPA, Nov.-Dec. 2010.
Fleming et al., Trading Activity and Price Transparency in the Inflation Swap Market, FRBNY Economic Policy Review, May 2013.
Jaffee et al., Catastrophe Insurance, Capital Markets, and Uninsurable Risks, Journal of Risk and Insurance (1986-1998), vol. 64, Issue 2 (1997).
U.S. Appl. No. 14/868,864, Final Office Action, dated Dec. 5, 2019.
U.S. Appl. No. 14/868,864, Final Office Action, dated Nov. 16, 2018.
U.S. Appl. No. 14/868,864, Nonfinal Office Action, dated Jun. 11, 2018.
U.S. Appl. No. 14/868,864, Nonfinal Office Action, dated Jun. 7, 2019.
U.S. Appl. No. 14/868,864, Office Action, dated Jun. 11, 2018.
U.S. Appl. No. 14/868,874, Final Office Action, dated Apr. 23, 2019.
U.S. Appl. No. 14/868,874, Final Office Action, dated Dec. 13, 2019.
U.S. Appl. No. 14/868,874, Nonfinal Office Action, dated Apr. 4, 2020.
U.S. Appl. No. 14/868,874, Nonfinal Office Action, dated Jan. 9, 2019.
U.S. Appl. No. 14/868,874, Nonfinal Office Action, dated Sep. 3, 2019.
U.S. Appl. No. 14/871,170, Final Office Action, dated Apr. 19, 2019.
U.S. Appl. No. 14/871,170, Final Office Action, dated Jan. 3, 2020.
U.S. Appl. No. 14/871,170, Nonfinal Office Action, dated Apr. 6, 2020.
U.S. Appl. No. 14/871,170, Nonfinal Office Action, dated Jun. 27, 2019.
U.S. Appl. No. 14/871,170, Nonfinal Office Action, dated Sep. 20, 2018.
U.S. Appl. No. 14/871,170, Office Action, dated Sep. 20, 2018.
U.S. Appl. No. 14/871,230, Final Office Action, dated Nov. 25, 2019.
U.S. Appl. No. 14/871,230, Nonfinal Office Action, dated Jul. 12, 2018.
U.S. Appl. No. 14/871,230, Nonfinal Office Action, dated Mar. 5, 2020.
U.S. Appl. No. 14/871,230, Nonfinal Office Action, dated May 23, 2019.
U.S. Appl. No. 14/871,273, Final Office Action, dated Nov. 15, 2019.
U.S. Appl. No. 14/871,273, Nonfinal Office Action, dated Apr. 3, 2019.
U.S. Appl. No. 14/871,273, Office Action, dated Aug. 15, 2018.
U.S. Appl. No. 14/871,273, Office Action, dated Feb. 9, 2018.
U.S. Appl. No. 14/871,306, Final Office Action, dated Apr. 16, 2020.
U.S. Appl. No. 14/871,306, Final Office Action, dated Aug. 26, 2019.
U.S. Appl. No. 14/871,306, Nonfinal Office Action, dated Apr. 1, 2019.
U.S. Appl. No. 14/871,306, Nonfinal Office Action, dated Jan. 8, 2020.
U.S. Appl. No. 14/871,306, Office Action, dated Aug. 16, 2018.
U.S. Appl. No. 14/871,306, Office Action, dated Dec. 5, 2018.
U.S. Appl. No. 14/871,341, Final Office Action, dated Dec. 26, 2018.
U.S. Appl. No. 14/871,341, Final Office Action, dated Dec. 31, 2019.
U.S. Appl. No. 14/871,341, Nonfinal office action, dated Jul. 10, 2018.
U.S. Appl. No. 14/871,341, Office Action, dated Jun. 25, 2019.
U.S. Appl. No. 14/871,401, Final Office Action, dated Jan. 15, 2019.
U.S. Appl. No. 14/871,401, Nonfinal Office Action, dated Jul. 26, 2018.
U.S. Appl. No. 14/871,401, Notice of Allowance, dated Aug. 12, 2019.
U.S. Appl. No. 15/457,705, Final Office Action, dated Oct. 7, 2019.
U.S. Appl. No. 15/457,705, Nonfinal Office Action, dated May 17, 2019.
U.S. Appl. No. 15/457,705, Roll et al., "System and Method for Obtaining and/or Maintaining Insurance Coverage", filed Mar. 13, 2017.
U.S. Appl. No. 15/704,339, Nonfinal Office Action, dated Jan. 2, 2020.
U.S. Appl. No. 15/704,339, Roll et al., "Systems and Methods for Obtaining and/or Maintaining Usage-Based Insurance", filed Sep. 14, 2017.
U.S. Appl. No. 15/704,340, Roll et al., "Systems and Methods for Obtaining and/or Maintaining Insurance for Autonomous Vehicles", filed Sep. 14, 2017.
U.S. Appl. No. 15/704,350, Nonfinal Office Action, dated Dec. 26, 2019.
U.S. Appl. No. 15/704,363, Nonfinal Office Action, dated Oct. 1, 2019.
U.S. Appl. No. 15/704,363, Roll et al., "Systems and Methods for Determining and Providing Insurance to Affinity Groups", filed Sep. 14, 2017.
U.S. Appl. No. 15/704,632, Nonfinal Office Action, dated Oct. 24, 2019.
U.S. Appl. No. 15/704,632, Roll et al., "Systems and Methods for Obtaining and/or Securing Insurance for Affinity Groups", filed Sep. 14, 2017.
U.S. Appl. No. 15/869,685, Nonfinal Office Action, dated Aug. 21, 2019.
U.S. Appl. No. 15/869,685, Notice of Allowance, dated Mar. 5, 2020.
U.S. Appl. No. 15/869,685, Roll et al., "Risk Mitigation for Affinity Groupings", filed Jan. 12, 2018.
U.S. Appl. No. 15/869,752, Nonfinal Office Action, dated Oct. 31, 2019.
U.S. Appl. No. 15/869,752, Notice of Allowance, dated Apr. 14, 2020.
U.S. Appl. No. 15/869,752, Roll et al., "Blockchain System and Methods for Providing Insurance to Affinity Groups", filed Jan. 12, 2018.
U.S. Appl. No. 16/679,768, Roll et al., System and Method for Obtaining And/Or Maintaining Insurance Coverage, filed Nov. 11, 2019.
U.S. Appl. No. 14/868,864, Nonfinal Office Action, dated Jun. 10, 2020.
U.S. Appl. No. 14/868,874, Final Office Action, dated Jul. 14, 2020.
U.S. Appl. No. 14/871,273, Notice of Allowance, dated Jul. 1, 2020.
U.S. Appl. No. 14/871,341, Nonfinal Office Action, dated Jun. 11, 2020.

(56) References Cited

OTHER PUBLICATIONS

U.S. Appl. No. 15/457,705, Nonfinal Office Action, dated Jul. 2, 2020.
U.S. Appl. No. 15/704,339, Final Office Action, dated Jul. 8, 2020.
U.S. Appl. No. 15/704,350, Final Office Action, dated Jul. 9, 2020.
U.S. Appl. No. 15/704,363, Final Office Action, dated May 29, 2020.
U.S. Appl. No. 15/704,632, Final Office Action, dated May 22, 2020.
U.S. Appl. No. 16/853,691, Roll et al., "Blockchain Systems and Methods for Providing Insurance Coverage to Affinity Groups", filed Apr. 20, 2020.
U.S. Appl. No. 16/853,693, Roll et al., "Blockchain Systems and Methods for Providing Insurance Coverage to Affinity Groups", filed Apr. 20, 2020.
U.S. Appl. No. 16/853,699, Roll et al., "Blockchain Systems and Methods for Providing Insurance Coverage to Affinity Groups", filed Apr. 20, 2020.
U.S. Appl. No. 16/853,704, Roll et al., "Blockchain Systems and Methods for Providing Insurance Coverage to Affinity Groups", filed Apr. 20, 2020.
U.S. Appl. No. 16/853,706, Roll et al., "Blockchain Systems and Methods for Providing Insurance Coverage to Affinity Groups", filed Apr. 20, 2020.
U.S. Appl. No. 16/892,500, Roll et al., "Risk Mitigation for Affinity Groupings", filed Jun. 4, 2020.
U.S. Appl. No. 16/910,687, Roll et al., "Machine Learning Technologies for Efficiently Obtaining Insurance Coverage", filed Jun. 24, 2020.
U.S. Appl. No. 16/910,695, Roll et al., "Affinity Group Auctions for Reinsurers", filed Jun. 24, 2020.
U.S. Appl. No. 16/910,702, Roll et al., "Systems and Methods for Efficiently Reinsuring Insurance Policies", filed Jun. 24, 2020.
U.S. Appl. No. 14/871,341, Final Office Action, dated Dec. 17, 2020.
U.S. Appl. No. 14/871,170, Final Office Action, dated Oct. 13, 2020.
U.S. Appl. No. 14/871,170, Nonfinal Office Action, dated Jan. 7, 2021.
U.S. Appl. No. 14/871,230, Final Office Action, dated Oct. 14, 2020.
U.S. Appl. No. 14/871,230, Nonfinal Office Action, dated Jan. 25, 2021.
U.S. Appl. No. 15/457,705, Final Office Action, dated Dec. 1, 2020.
U.S. Appl. No. 15/704,363, Nonfinal Office Action, dated Sep. 30, 2020.
U.S. Appl. No. 15/704,632, Nonfinal Office Action, dated Oct. 2, 2020.
U.S. Appl. No. 16/679,768, Nonfinal Office Action, dated Oct. 1, 2020.

* cited by examiner

US 11,354,750 B1

BLOCKCHAIN SYSTEMS AND METHODS FOR PROVIDING INSURANCE COVERAGE TO AFFINITY GROUPS

CROSS-REFERENCE TO RELATED APPLICATIONS

This application is a continuation of U.S. application Ser. No. 15/869,752 filed on Jan. 12, 2018 and entitled "Blockchain Systems and Methods for Providing Insurance Coverage to Affinity Groups," now U.S. Pat. No. 10,664,920, which claims priority to and the benefit of U.S. Application No. 62/471,224, filed Mar. 14, 2017 and entitled "System and Method for Obtaining and/or Maintaining Insurance Coverage," claims priority to and the benefit of U.S. Application No. 62/485,725, filed Apr. 14, 2017 and entitled "System and Method for Obtaining and/or Maintaining Insurance Coverage," and claims priority to and the benefit of U.S. Application No. 62/503,184, filed May 8, 2017 and entitled "System and Method for Obtaining and/or Maintaining Insurance Coverage," the entire disclosures of which are hereby incorporated by reference herein. U.S. application Ser. No. 15/869,752 filed on Jan. 12, 2018 and entitled "Blockchain Systems and Methods for Providing Insurance Coverage to Affinity Groups," is a continuation-in-part of U.S. application Ser. No. 14/871,401 filed on Sep. 30, 2015 and entitled "System and Method for Obtaining and/or a Maintaining Insurance Coverage," now U.S. Pat. No. 10,510,120, which claims priority to and the benefit of:

U.S. Provisional Application No. 62/060,080 filed on Oct. 6, 2014 and entitled "System and Method for Obtaining and/or a Maintaining Insurance Coverage,"

U.S. Provisional Application No. 62/104,596 filed on Jan. 16, 2015 and entitled "System and Method for Obtaining and/or a Maintaining Insurance Coverage,"

U.S. Provisional Application No. 62/189,885 filed on Jul. 8, 2015 and entitled "System and Method for Obtaining and/or a Maintaining Insurance Coverage," and U.S. Provisional Application No. 62/199,008 filed on Jul. 30, 2015 and entitled "System and Method for Obtaining and/or a Maintaining Insurance Coverage, the entire disclosures of which are hereby incorporated by reference herein.

FIELD OF THE DISCLOSURE

The present disclosure generally relates to insurance and, more specifically, to systems and methods for obtaining and/or maintaining insurance coverage.

BACKGROUND

Individuals who seek insurance coverage and are sensitive to pricing and product features (e.g., coverage types and/or limits, deductibles, etc.) often expend considerable time and effort in finding insurance providers that best meet their needs. Conventionally, a consumer finds an insurance provider by way of an agent/broker, an aggregator, a comparison web site, general web browsing, etc. Once the consumer obtains an insurance policy from the desired provider, the consumer is typically tied to that provider, and to the rate and product features of the policy offered by the provider, until and unless he or she proactively shops around for a new provider offering a policy with a better rate and/or product features. For example, a consumer might decide to look into the offerings of other insurance providers when the consumer's current policy is up for renewal. Thus, a consumer typically must either spend time and effort looking for better insurance offerings on a recurring basis (e.g., once every six months or annually), or simply renew his or her current policy regardless of whether that policy provides the best rate and/or product features.

SUMMARY

The present embodiments may, inter alia, automatically provide consumers with insurance policies that offer superior rates and/or product features on a continuing basis (e.g., across multiple policy terms), thereby reducing or eliminating the time and/or effort that consumers must spend researching the offerings of different insurance providers, as well as providing consumers with insurance policies that have lower cost and/or are more reflective of a risk score, characteristics, and/or preferences of the consumer as they change over time. The terms "consumer" and "customer" are utilized interchangeably herein, and generally refer to a person who is an insured party or a potential insured party. A consumer or customer may be represented by himself or herself, or may be represented by an agent (e.g., by a spouse, a person who has power of attorney for the consumer or customer, an administrative assistant, etc.).

An intermediary entity may act on behalf of consumers and/or their agents to find policy rates and/or other features that best meet the consumers' insurance requirements and/or preferences. Based upon consumer or customer characteristics and/or insurance preferences, each consumer or customer may be grouped with other insurance consumers or customers that have the same or similar characteristics and/or insurance preferences. The insurance consumer or customer groupings may be based upon demographic information (e.g., gender, birth date, etc.), information about the consumer's property (e.g., a make, model and year of an automobile, etc.), claim and/or accident history of the consumer, risk (or lack thereof) characteristics of the group members, insurance claim expectations of the group members, insurance company ratings, the content and/or availability of telematics data obtained from vehicles and/or mobile devices of the group members, driving behavior, etc. The insurance consumer or customer groupings may be offered for sale to various insurance providers, such as through an online auction. Once a winning bid is accepted, any existing insurance policies of the consumer or customers affiliated with the auctioned group may (or may not) be updated to reflect new insurance policy terms or parameters (e.g., premiums, rates, etc.), discounts, refunds, etc. In some cases, new insurance policies may be provided to one or more consumers (such as when a consumer is an insurance applicant, or when an existing insurance policy is canceled and a new policy is issued in its stead). The consumer or customer groups may be updated (and/or new consumer or customer groups may be created) over time as new or more recent consumer or customer characteristic data and/or preference information is collected and/or updated. Then the insurance policies associated with the updated (or new) consumer or customer groups may be re-auctioned (or auctioned).

In one aspect, a computer-implemented method for utilizing blockchain systems, methods, and/or techniques to provide insurance coverage to affinity groups includes receiving, via one or more network interfaces of an enforcement server, and by using an electronic or communications network, a plurality of bidding actions submitted by a plurality of bidding entities in response to a notification of an auction of an opportunity to provide insurance for an affinity group, where the auction is administered by the enforcement server via the electronic or communications network. The method may further include compiling, by the enforcement server, a plurality of transactions corresponding to the plurality of bidding actions into a block of transactions, which may, for example, correspond to a particular round of bidding. The method may also include updating, by the enforcement server, a plurality of copies of a distributed ledger with the block of transactions, where the plurality of copies of the distributed ledger are stored in a plurality of computing devices respectively corresponding to the plurality of bidding entities; identifying, based upon the updated distributed ledger, a winning bid for the auction corresponding to the affinity group based upon multiple updates to the distributed ledger, the multiple updates corresponding to multiple blocks of transactions; and providing, by the enforcement server to a particular bidding entity corresponding to the winning bid, data descriptive of members of the affinity group for use by the particular bidding entity in generating and/or modifying one or more insurance policies for the affinity group. The method may include additional, fewer, or alternate actions, including those discussed elsewhere herein.

In another aspect, a system for utilizing blockchain systems, methods, and/or techniques to provide insurance coverage to affinity groups may include one or more persistent memories storing an auction database and one or more communication interfaces configured to communicate with remote devices via one or more networks. The system may further include a blockchain manager unit comprising computer-executable instructions that are stored on one or more non-transitory, computer-readable storage media and that, when executed by one or more processors, may cause the system to: compile a plurality of transactions into a block of transactions, the plurality of transactions corresponding to a plurality of bidding actions submitted by a plurality of bidding entities as part of an auction of an opportunity to provide insurance for an affinity group, and the plurality of bidding actions received at the system via the one or more communication interfaces; update, via the one or more communication interfaces, a plurality of copies of a distributed ledger with the block of transactions, where the plurality of copies of the distributed ledger are stored in a plurality of computing devices respectively corresponding to the plurality of bidding entities; identify, based upon the updated distributed ledger, a winning bid for the auction corresponding to the affinity group based upon multiple updates to the distributed ledger, the multiple updates corresponding to multiple blocks of transactions; store, in the auction database, an indication of the winning bid for the auction corresponding to the affinity group and an indication of a particular bidding entity that submitted the winning bid; and provide, to a computing device corresponding to the particular bidding entity that submitted the winning bid, data descriptive of members of the affinity group for use by the particular bidding entity in generating and/or modifying one or more insurance policies for the members of the affinity group. The system may include additional, fewer, or alternate components and/or elements, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
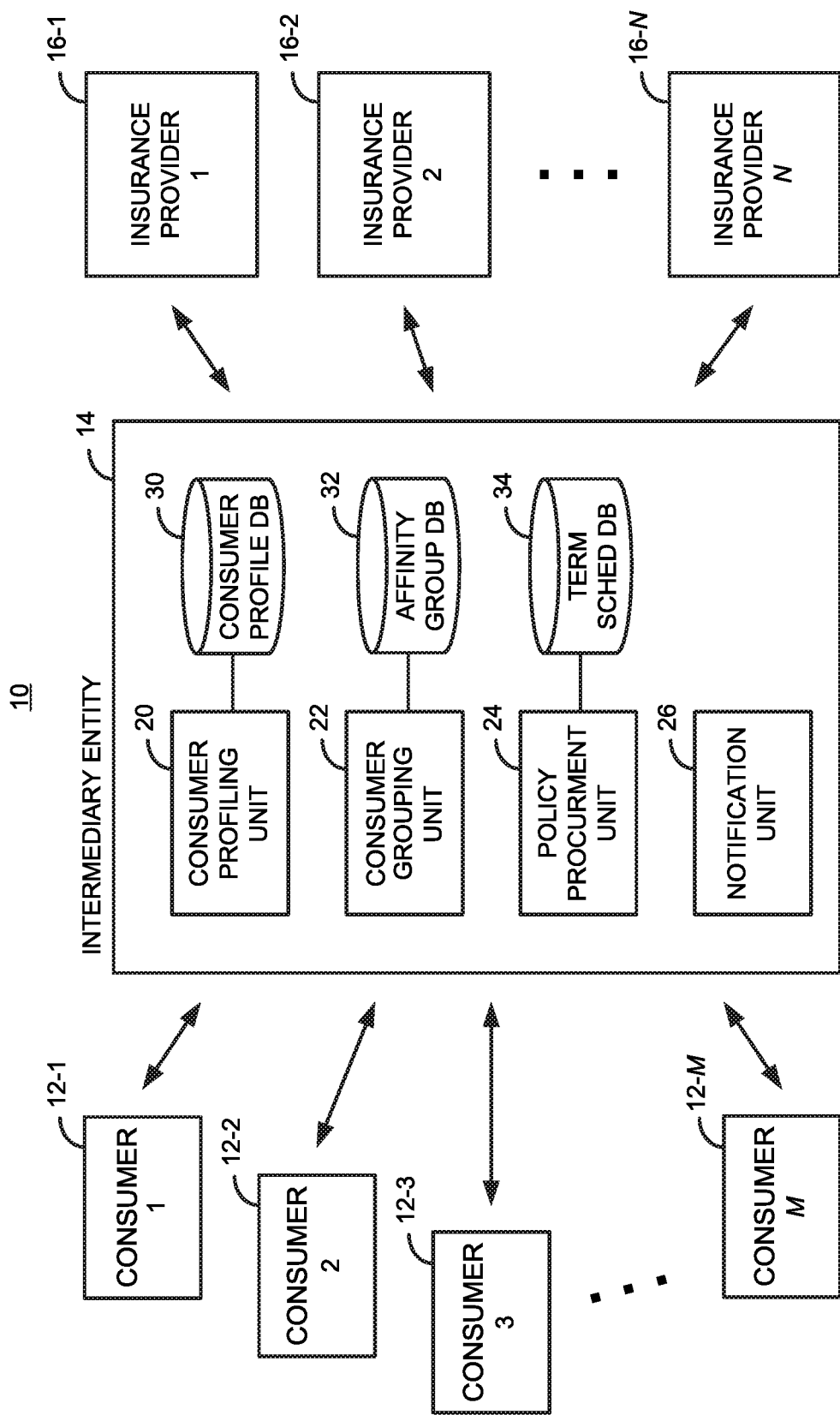
FIG. 1 depicts an exemplary environment including components associated with obtaining and/or maintaining insurance coverage, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. Exemplary Automatic Procurement and Maintenance of Insurance Coverage

The present embodiments relate to, inter alia, obtaining and/or maintaining insurance coverage with insurance policies having advantageous rates and/or product features. The insurance policies may be policies for any type of insurance, such as automobile or other vehicle insurance, home or condominium insurance, personal property insurance or life insurance, health insurance, pet insurance, burial insurance, for example.

In some embodiments, an intermediary entity may act on behalf of consumers to find policy rates and/or other features that best meet the consumers' insurance requirements and/or preferences. For example, for individuals or end-consumers (e.g., persons or people), each individual or end-consumer may access an application form (e.g., an on-line form) and enter information relevant to the availability and/or pricing of the consumer's desired insurance policy, such as demographic information (e.g., gender, birth date, etc.), information about the consumer's property (e.g., a make, model and year of an automobile, etc.), claim and/or accident history of the consumer, and so on. In one embodiment, based upon the entered information, the individual or end-consumer may be grouped together with one or more other end-consumers in an "affinity group." The affinity group may be defined by any suitable criterion or criteria, such as insurance provider requirements and/or classifications, behavioral and/or attitudinal segmentation, member requirements and/or preferences, etc. To provide just a few more specific examples, the affinity group may be defined by the occupation of the group members, risk characteristics of the group members (e.g., as is typically determined during the underwriting process), insurance claim expectations of the group members (e.g., based upon past claim history and/or risk characteristics), insurance company ratings required or preferred by the group members (e.g., AAA), the content and/or availability of telematics data obtained from vehicles of the group members, etc. An affinity group may be established any time that two or more members are identified as meeting the group requirements, or may be established only when some higher threshold number of members (e.g., 100 members, 1,000 members, etc.) has been met, for example. In some implementations, an affinity group may be pre-defined (at least in part, or solely) by individuals' or end-consumers' memberships in (or affiliations with) an organization, such as a professional organization or association, a fraternity or sorority, a service or volunteer organization, a business or company, etc. That is, the affinity group may be pre-defined by a third party.

In some embodiments, the intermediary may act on behalf of a consumer that is not a person, individual, or end-consumer, but instead is an organization, company, business, or other entity that provides a product and/or service to individuals or end-consumers and that wishes to procure insurance to cover its products, services, and/or assets associated therewith. As such, the consumer may be a third-party that desires to procure insurance for a group of products, services, and/or assets associated therewith, rather than procure insurance for a group of people or end-consumers.

For example, a car rental company may wish to procure insurance for a fleet of rental cars, or an autonomous vehicle manufacturer may wish to procure insurance for a fleet of autonomous vehicles. Other examples of consumers that are not individuals or end-consumers may include owners of multi-tenant buildings whose units are leased to end-consumers (e.g., university housing, apartment complexes, etc.), a car sharing service or other service that provides fractional use of assets and/or services to various end-consumers, a provider of time-shares or other assets that are fractionally-owned by end-consumers, and the like.

In these embodiments, an affinity group may be pre-defined by the third-party (e.g., by the business, company, organization, entity, etc.), and affinity group members may comprise the products, services, and/or assets associated therewith corresponding to the defined affinity group. For example, a car rental company may pre-define a set of a particular type of rental car (e.g., economy, mini, premium, etc.) as an affinity group, a time-share provider may pre-define a set of condominiums in a particular location as an affinity group, or an autonomous vehicle manufacturer may pre-define a set of autonomous vehicles having certain autonomous control features and/or limitations, etc. as an affinity group.

For affinity groups that are pre-defined (e.g., based upon end-consumer membership or affiliation, and/or based upon sets of assets and/or services), a universal insurance application may be provided to each member of the pre-defined affinity group, and/or for each asset or service (e.g., for each object of insurance) for which coverage is desired. The universal application may request similar information for all members or objects of the pre-defined affinity group, and in some cases, at least some portions of the universal application may utilize common data for each member or object of the pre-defined affinity group. For example, a common desired term length, maximum deductible, and/or coverage amount may be pre-defined in the universal application for all members/assets/services. If desired, value of other insurance application fields may vary across members of the affinity group, for example, age, driving record, home address, etc.

Once an affinity group has been established, the intermediary entity may present information about the affinity group members to a number of insurance providers/carriers, along with a request for insurance coverage quotes, that is, the intermediary entity may offer an opportunity to provide insurance for the affinity group members. For example, the intermediary entity may hold an auction within a particular time period or window of time. During the auction, the participating insurance providers may be permitted to bid on providing insurance for the affinity group. The insurance provider that "wins" by bidding the lowest price/rate (given the profile of the affinity group members), or more generally, in some embodiments, by bidding to provide a policy that aligns most closely with the requirements and/or preferences of the group members, may be chosen to provide the insurance to the members of the affinity group for a specified time period or term (e.g., six months).

In some embodiments, the winning insurance provider may issue insurance policies that have at least some terms in common for each member or object of the affinity group. For example, each member of an affinity group based upon a professional organization may be issued an insurance policy having the same term length, deductible amount, maximum medical coverage amount, etc. In another example, each autonomous vehicle included in an affinity group may be covered by a same per-vehicle liability limit or a same amount of collision coverage.

At any rate, during the term of the insurance policies that have been issued to end-consumers or individuals based upon the auction, the winning insurance provider may directly handle claims and other inquiries from the members of the affinity group (e.g., on-line and/or via a dedicated call center), and the members of the affinity group may have their checking accounts, credit cards, and/or other fund sources automatically debited (e.g., periodically) by the winning insurance provider in order to pay for the insurance coverage. Similarly, during the term of one or more insurance policies that have issued to cover a group of assets or services, the insured party (e.g., the organization or entity that owns or provides the covered group of assets or services on behalf of which the intermediary has procured insurance) may provide automatic payments to the winning insurance provider to pay for the insurance coverage.

In some embodiments, the intermediary entity may, prior to the conclusion of each of one or more policy terms for the affinity group members, automatically conduct another auction for the affinity group. In this manner, the affinity group members may continually receive the most competitively priced insurance coverage (and/or the insurance with the best product features), with little or no additional effort by the group members. Some of the benefits and/or pricing discounts earned by group members, such as loyalty or accident-free discounts, may become a part of the profile of the affinity group, and may be priced into the future costs of the affinity group's insurance coverage. If a member of the affinity group has a driving violation or accident, the member may be moved to a different affinity group to which the member better aligns (e.g., to an affinity group with more similar risk characteristics and/or insurance claim expectations, etc.) for future auctions. Additionally or alternatively, a particular member of the affinity group may choose to opt-out upon the expiration of the policy term. The intermediary entity may conduct insurance coverage auctions for a number of different affinity groups. The intermediary entity may form new groups, rearrange existing groups, and/or shop groups to insurance providers on a periodic (e.g., daily) basis, or on any other suitable basis.

In some embodiments, the intermediary entity may instead (or additionally) obtain insurance policies for consumers on an individual basis. For example, the intermediary entity may use a consumer profile (e.g., containing information that was entered in an on-line or other application form, claim information, telematics data, etc.) to automatically seek out an insurance company providing a policy that best meets the pricing and/or product feature requirements and/or preferences of the consumer. The intermediary entity may automatically perform this process when the consumer first obtains a policy and/or each time that the consumer's current policy is up for renewal. In these embodiments, the intermediary entity may seek the best insurance provider/policy each term (e.g., each six months) without conducting auctions. For example, the intermediary entity may instead request a single quote from each of multiple insurance providers each time that a current policy term is drawing to a close, and select the provider with the "best" (e.g., lowest price) quote for the next term without entertaining a second round of bids.

The intermediary entity may obtain revenue in various different ways according to different embodiments. For example, the insurance provider that offers or submits a winning bid in an auction might pay the intermediary entity a flat administrative fee, and/or a commission that includes a percentage of the insurance premium(s) for the affinity group. Alternatively, or additionally, each member of the affinity group might pay the intermediary entity an annual membership fee.

By using one or more of the techniques described above, consumers may be able to obtain insurance coverage at the most competitive price available, on a continuing basis and without the hassles of shopping for insurance on their own. Moreover, participating insurance providers may be able to attract larger groups of consumers, including those who otherwise may not have considered those providers for their insurance needs.

II. Exemplary Environment for Automatically Obtaining and Maintaining Insurance Coverage FIG. 1 depicts an example environment 10 including components associated with obtaining and/or maintaining insurance coverage, according to one embodiment. As illustrated in FIG. 1, the environment 10 may include M computing devices 12-1 through 12-M associated with M respective consumers (e.g., thousands of consumers, millions of consumers, etc.). Each of the computing devices 12-1 through 12-M may be any suitable type of computing device having wired and/or wireless communication capabilities, such as a personal computer, tablet, phablet, smartphone, etc.

The environment 10 may also include a computing system 14 associated with an intermediary entity. The computing system 14 may include one or more servers of the intermediary entity, or may include a plurality of networked computing devices that have an appearance of a single, logical computing device or system, e.g., a group of cloud computing devices. The computing system 14 may be communicatively coupled to computing devices 12-1 through 12-M via a network (not shown in FIG. 1). The network may be a single communication network, or may include multiple communication networks of one or more types (e.g., one or more wired and/or wireless local area networks (LANs), and/or one or more wired and/or wireless wide area networks (WANs) such as the Internet), for example.

It is noted that while the computing system 14 and the environment 10 are discussed above with reference to individuals or end-consumers who desire to procure insurance, the techniques and features of the computing system 14 and the environment 10 may easily be applied to consumers that are not individuals or end-consumers who desire to procure insurance, but instead are organizations, companies, or other entities that desire to procure insurance for a pre-defined group of individuals or end-consumers, and/or that desire to procure insurance for a pre-defined group of assets or services that are to be provided to individuals or end-consumers (e.g., as previously discussed). For example, computing devices 12-1 through 12-M may include individual or end-consumers, and/or may include consumers that are organizations, companies, or other entities, e.g., as discussed above. Indeed, any of the methods, systems, features, and/or techniques discussed herein may apply equally to consumers who are individuals or end-consumers, and to consumers that are organizations, companies, or other entities.

At any rate, the environment 10 may also include computing systems 16-1 through 16-N associated with N respective insurance providers (e.g., two insurance providers, five insurance providers, etc.). Each of the computing systems 16-1 through 16-N may include one or more servers or computing devices of the respective insurance provider, and may be communicatively coupled to computing system 14 via a network (not shown in FIG. 1). The network may be a single communication network, or may include multiple communication networks of one or more types (e.g., one or more wired and/or wireless LANs, and/or one or more wired and/or wireless WANs such as the Internet), for example. Each of the insurance providers 16-1 through 16-N may be a company providing a particular type or types of insurance, such as automobile or other vehicle insurance, home or condominium insurance, personal property insurance and/or life insurance, for example.

The computing system 14 may include various units, including a consumer profiling unit 20, a consumer grouping unit 22, a policy procurement unit 24 and a notification unit 26. Each of some or all of the units 20, 22, 24 and 26 may be (or may include) a respective set of one or more computing devices or processors that executes software instructions to perform the corresponding functions described herein. Alternatively, each of some or all of the units 20, 22, 24 and 26 may be or include a respective component of software that is stored on one or more computer-readable media (e.g., a random access memory (RAM) and/or read-only memory (ROM) of the computing system 14) and executed by one or more processors of the computing system 14 to perform the corresponding functions described herein. Further, one or more of the units may be combined into a single unit, or may be omitted. In various different embodiments, for example, the computing system 14 does not include consumer grouping unit 22 and/or notification unit 26.

Generally, in one embodiment, consumer profiling unit 20 collects information regarding the consumers operating computing devices 12-1 through 12-M, and stores the collected information in a consumer or customer profile database 30 that includes a separate profile for each consumer. The consumer or customer profile database 30 may be any suitable type of persistent memory. Consumer profiling unit 20 may obtain the information in any of one or more ways. For example, consumer profiling unit 20 may obtain demographic information (e.g., gender, birth date) and information about consumers' properties (e.g., makes, models and years of automobiles, etc.) via on-line forms (e.g., insurance applications and/or reviews) filled out by the consumers using computing devices 12-1 through 12-M. The consumer profiling unit 20 may provide the on-line forms as one or more web pages (e.g., HTML files, JavaServer Pages files, etc.) stored in a memory of the computing system 14, and the consumers may use web browser applications executing on the computing devices 12-1 through 12-M to access the web page(s), for example. Via the on-line forms, or via other suitable means, consumer profiling unit 20 may also collect insurance preferences and/or requirements of the various consumers. For example, each consumer may enter his or her preferred or required coverage types, coverage limits, deductibles, insurance provider ratings (e.g., AAA), and/or any other preference or requirement relating to insurance. A consumer may indicate that he or she prefers to have a policy through an insurance company that offers live insurance agents, for example. In an alternative embodiment and/or scenario, some or all of the consumers provide information via physical application forms, and some or all of the computing devices 12-1 through 12-M may be omitted in the example environment 10. Generally, the customer profiling unit 20 may store the individual preferences of a particular customer consumer (or indications thereof) in a respective customer profile of the customer profile database 30.

Further, consumer profiling unit 20 may collect other information that is also to be stored in consumer profile database 30. For a consumer already having an insurance policy with an insurance provider (e.g., one of the insurance providers associated with computing systems 16-1 through 16-N), for example, consumer profiling unit 20 may receive or obtain information from the consumer's insurance account and/or policy. For example, claims information from that provider (e.g., number and/or dates of past claims, past claim payouts made to or on behalf of the consumer, etc.) may be obtained. Alternatively, or additionally, consumer profiling unit 20 may receive telematics data indicative of a consumer's driving performance (e.g., acceleration data, braking data, cornering data, etc.). Generally, the customer profiling unit 20 may store individual characteristics of a particular customer or consumer (or indications thereof) in a respective customer profile within the customer profile database 30. Individual customer characteristics may include, for example, age, account status (for customers who have insurance policies that are in force), marital status, education level, occupation, finances or income, driving history, accident history, vehicle type, home type, geographical location, risk score, driving behavior, and/or other individual customer characteristics. Consumer grouping unit 22 may utilize at least some of the consumer information stored in consumer profile database 30 to form one or more affinity groups, and store indications of which of the consumers belong to which affinity groups in an affinity group database 32. The affinity group database 32 may be any suitable type of persistent memory (e.g., the same memory storing consumer profile database 30). Consumer grouping unit 22 may place the consumers into the affinity group(s) based upon the criteria of the groups, which may reflect consumer preferences and/or requirements, insurance provider requirements and/or classifications, and/or behavioral and/or attitudinal segmentation of consumers (e.g., as determined using telematics data indicating driving performance/behaviors), for example.

Policy procurement unit 24 may conduct an automated auction in order to obtain insurance policies for the members of each of the one or more affinity groups. For a given affinity group, policy procurement unit 24 may send information defining the group membership criteria, and/or information about the individual members (e.g., profile information stored in consumer profile database 30), to each of the insurance provider computing systems 16-1 through 16-M, along with a request for insurance premium quotes. After analyzing the information, one or more of the insurance providers may decide to bid on the provision of insurance to the affinity group, and policy procurement unit 24 may receive the bid(s) from the respective ones of insurance provider computing systems 16-1 through 16-M. Policy procurement unit 24 may send each received bid to all others of the insurance provider computing systems 16-1 through 16-M, and bidding may continue in an iterative fashion until auction termination criteria have been met (e.g., until a predetermined amount of time elapses, or until a predetermined amount of time since the last bid elapses, etc.). The insurance provider having the best bid (e.g., lowest price and/or best non-price features) at the time the auction terminates may be granted the ability to provide insurance policies to the members of the affinity group.

The intermediary entity may be authorized to enter a binding contract for the policy/policies on behalf of the consumers, or may require some confirmation or election by the members of the affinity group. If a contract is automatically established via by the agency of the intermediary entity, notification unit 26 may cause the members of the affinity group to be informed of the new insurance provider and the new policy (e.g., by email, letter, etc.). If consumer confirmation or election is required, notification unit 26 may instead cause the members of the affinity group to be sent an indication of the best offer or offers and the corresponding providers, along with a request for confirmation or election. Policy procurement unit 24 may then form the contract with the winning insurance provider after the confirmation or election, for example.

In some embodiments, policy procurement unit 24 may also be responsible for renewing existing insurance policies, or switching to a new provider and policy if a better rate and/or other policy features can be found. For example, policy procurement unit 24 may store policy term data for all procured policies in a term schedule database 34 (which may be any suitable type of persistent memory, such as the memory storing consumer profile database 30 and/or affinity group database 32), and may access term schedule database 34 to detect when policy terms are nearing their end (e.g., one month before expiration, or one week before expiration, etc.). When policy terms are nearing their end for the members of an affinity group, policy procurement unit 24 may conduct a new auction among the insurance providers (possibly including more, fewer and/or different providers than had participated in the previous auction), and a new winning provider may be identified. If the winning provider is the same as the current provider, the policies may simply be renewed. Again, notification unit 26 may cause the members of the affinity group to be notified of the renewal (or to be notified of the switch to a new provider), or may first request confirmation or an election from the members. In some embodiments, the affinity group may be reviewed and/or adjusted (e.g., members added and/or removed) by consumer grouping unit 22 prior to each auction, to help ensure that the affinity group criteria continue to be met by all of its members.

In some embodiments and/or scenarios, all members of a single affinity group are provided with policies that have identical start and stop dates. In other embodiments and/or scenarios, at least some of the members may be provided with policies having different start and/or stop dates (e.g., based upon requested start and/or stop dates stored in the consumer profile database 30, etc.).

In some embodiments, consumer grouping unit 22 is omitted, and the computing system 14 only attempts to obtain insurance coverage for consumers on an individual basis. In one such embodiment, policy procurement unit 24 may obtain the best rate for each consumer not by conducting an auction, but rather by automatically requesting a single quote from each of the insurance providers, and taking the best quote (e.g., the lowest premium, and/or a quote with other features best matching the consumer's preferences and/or requirements). Similar to the auction embodiments described above, policy procurement unit 24 may detect when a renewal time is approaching, and automatically request a new round of quotes from the insurance providers at that time to determine whether to renew the consumer's current policy or to initiate a new policy with a new provider. Notification unit 26 may simply notify the consumer of the policy and provider for each upcoming term, or may first request confirmation or election of a particular policy/provider.

Figure 2:
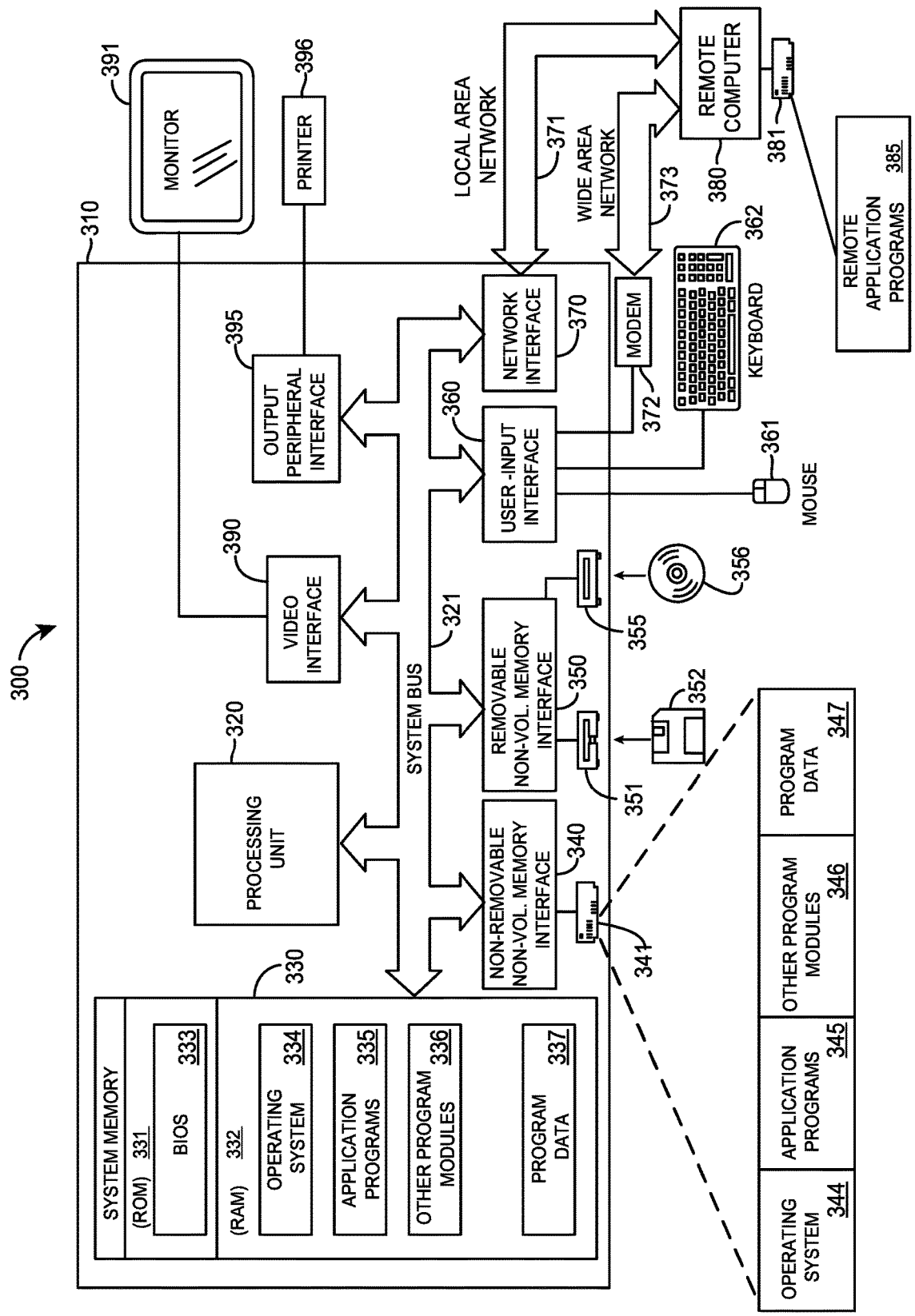
FIG. 2 depicts an exemplary computer system in which the techniques described herein may be implemented, according to one embodiment.

III. Exemplary Computer System for Automatically Obtaining and/or Maintaining Insurance Coverage FIG. 2 depicts an example computer system 300 in which the techniques described herein may be implemented, according to one embodiment. In one embodiment, the computer system 300 may be included in the system 10 of FIG. 1. For example, any one or more of the units 20-26 may comprise one or more instances of the computer system 300, or the intermediary entity 14 may comprise one or more instances of the computer system 300. The computer system 300 of FIG. 2 includes a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically includes a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media includes tangible, volatile and nonvolatile, removable and non-removable media implemented in any method or technology for non-transitory storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 2 illustrates operating system 334, application programs 335, other program modules 336, and program data 337.

The computer 310 may also include other removable/non-removable, volatile/nonvolatile computer storage media. By way of example only, FIG. 2 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 2 provide storage of computer-readable instructions, data structures, program modules and other data for the computer 310. In FIG. 2, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 2. The logical connections depicted in FIG. 2 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 2 illustrates remote application programs 385 as residing on memory device 381.

In some configurations, the computer 310 may be included in a plurality of networked computers or computing devices that have the logical appearance as a single, integral computing node, e.g., a cloud computing system. For example, the application programs 345, other program modules 346 and/or program data 337 may be stored in and executed by the logical, single computing node.

The techniques for automatically obtaining and/or maintaining insurance coverage described above may be implemented in part or in their entirety within a computer system such as the computer system 300 illustrated in FIG. 2. The computer 310 may be a server or computing device of an intermediary entity (e.g., within the computing system 14 of FIG. 1), and the remote computer 380 may be a server or computing device of an insurance provider (e.g., within one of the computing systems 16-1 through 16-N of FIG. 1), for example. In some such embodiments, the LAN 371 may be omitted (e.g., communications may between computer 310 and computer 380 may only occur via WAN 373). Application programs 335 and 345 may include programs that implement the consumer profiling unit 20, consumer grouping unit 22, policy procurement unit 24 and/or notification unit 26 of FIG. 1, for example. Consumer profile database 30, affinity group database 32 and/or term schedule database 34 may be stored on hard disk drive 341, magnetic disk 352 or optical disk 356, for example.

In operation, the computer 310 may receive demographic, property, preference and/or other information from consumer computing devices (not shown in FIG. 2), form affinity groups based upon that information, provide the remote computer 380 (and one or more other, similar computers of other insurance providers) at least some of the consumer information along with a request for bids, and receive bids from the remote computer 380 (and/or from one or more other, similar computers of other insurance providers). The computer 310 may then determine the winning bid and notify the consumers in the affinity group by sending messages (e.g., emails) to the appropriate consumer computing devices, for example.

IV. Exemplary Computer-Implemented Method

Figure 3:
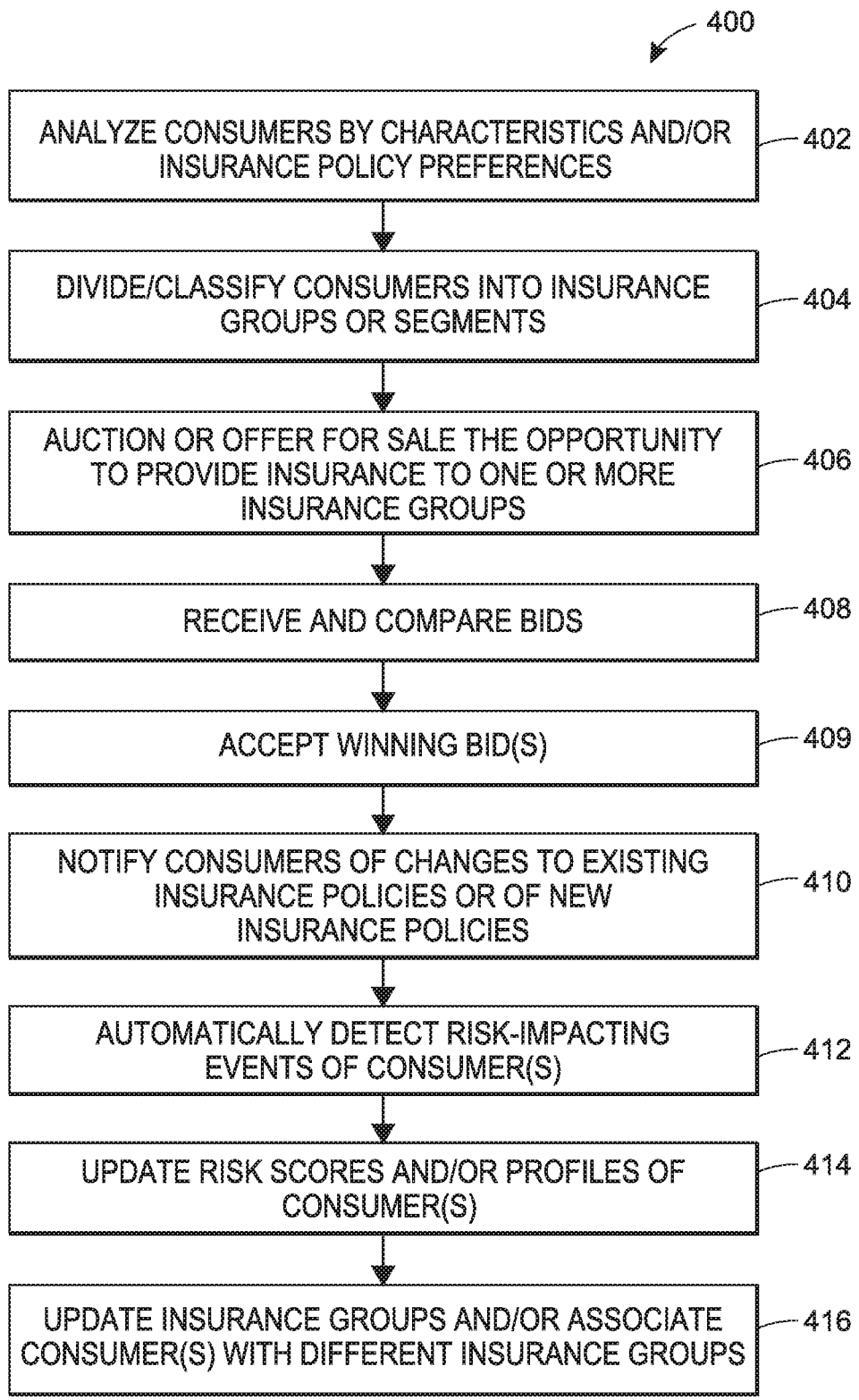
FIG. 3 depicts an exemplary computer-implemented method of auctioning groups or bundles of insurance policies.

FIG. 3 illustrates an exemplary computer-implemented method, e.g., for auctioning groups of insurance policies 400 or providing insurance to groups of consumers or customers. In one embodiment, at least a portion of the method 400 may be performed by the system 10 of FIG. 1 and/or by the computer system 300 of FIG. 2. The method 400 may include, via one or more processors, computing devices, or servers: analyzing a set of insurance customers by their individual characteristics and/or insurance policy preferences 402; dividing and/or classifying the set of insurance customers into groups or segments based upon the customers' individual characteristics and/or preferences 404; auctioning or offering for sale the opportunity to provide insurance to one or more groups 406; receiving and comparing one or more bids 408; accepting one or more winning bids 409; notifying insurance customers of new insurance policies and/or changes to existing insurance policies, premiums, discounts, etc. 410; automatically detecting driving events or other events that may impact a risk score and/or a customer profile of a customer associated with a particular insurance group or segment 412; updating the customer's risk score or profile 414; and/or updating the particular insurance group or segment with which the customer is associated, and/or moving the customer to be associated with another group or segment 416. After a number of customers have been moved to new or different groups or segments, another auction of the new or updated groups may be held 406, the process may continue 408, 409, 410, 412, 414, 416, etc. The method may include additional, fewer, or alternate actions, including those discussed elsewhere herein.

The method 400 may include (e.g., via one or more processors, computing devices, or servers) analyzing insurance customers by their individual characteristics and/or insurance policy preferences 402. In one embodiment, insurance customer characteristics and/or insurance policy preferences (or indications thereof) may be stored in the customer profile database 30, so that each customer profile stored therein includes indications of individual customer characteristics and/or preferences of the respective customer. The analysis of insurance customers may include analysis of customers' insurance policy preferences, such as by insurance coverages, deductibles, and/or limits typically desired or requested by individual customers. For instance, a group of customers may prefer a $500 deductible for homeowner's and/or automobile insurance. Another group of customers may prefer a $1,000 deductible for homeowner's and/or automobile insurance. As another example, groups of customer may prefer to have: $300,000 (or other amounts) of liability coverage for various insurance policies; certain types of coverages and/or insurance; certain levels of deductibles; $250,000, $500,000, or other amounts of coverage for health or life insurance; etc. Additionally or alternatively, the analysis of insurance customers may include analysis of other preferences, such as a particular characteristic of an insurance company (e.g., rating, web presence, proximity of local agent office, etc.) and/or claims expectations. Thus, groups of similarly minded customers may be grouped together based upon similar preferences of insurance parameters and/or terms.

Additionally or alternatively, groups of customers may be grouped together based upon similar customer characteristics. Characteristics that may be analyzed by the one or more processors may include customer risk, risk scores, age, account status (e.g., when a customer is presently insured), marital status, finances or income, education level, occupation, driving history, accident history, geographical location, vehicle type, home type, and/or other individual characteristics of customers. Also, in some embodiments, telematics data associated with a customer's driving behavior may be analyzed for use in classifying or grouping customers/drivers. One or more processors may access a database and/or customer profiles that are stored in one or more memory units (local and/or remote memory units) to analyze the customer characteristics and/or customer insurance policy preferences, for example.

The method 400 may include (e.g., via the one or more processors, computing devices or servers), dividing, grouping, and/or classifying insurance customers into groups or segments 404. For example, one or more insurance customers, insurance applications, insurance customer accounts, and/or insurance policies may be grouped together or segmented into an insurance policy group, also referred to interchangeably herein as an insurance customer group or an insurance group. Based upon the analysis of customers mentioned above (such as computer analysis of customer characteristics, customer insurance policy preferences, and/or telematics data), the customers may be divided into groups or segments of customers having similar characteristics and/or preferences. For instance, one group or segment of automobile insurance customers may be characterized as (1) low risk drivers or drivers with a risk score within a given range; (2) owners of a certain type of vehicle or vehicles; (3) living within a particular geographical location (e.g., a given state, city, or zip code); (4) having one or more deductible preferences; (5) having one or more coverage preferences; (6) having one or more common characteristics (age, education, marital status, occupation, etc.); (7) having similar driving or accident histories, and/or lack of vehicle accidents; and/or (8) other common factors.

In one embodiment, insurance customer or policy groups may additionally or alternatively be defined by behavioral and attitudinal segmentation and/or customer criteria, such as occupation, risk characteristics, insurance claims expectations, insurance company ratings, and/or telematics data gathered from or associated with customer vehicles or customer driving behavior. Other customer or policy groups or segments may be defined, including those discussed elsewhere herein.

In one embodiment, an indication of each insurance policy group, an indication of the one or more consumers associated with each insurance policy group, and/or an indication of the one or more preferences and/or characteristics that corresponded to the formation of each insurance policy group may be stored. For example, the customer grouping unit 22 may store one or more of said indications in the affinity group database 32.

The method 400 may include (e.g., via the one or more processors, computing devices or servers), auctioning or offering for sale the opportunity to provide insurance for one or more of the insurance customer groups 406. Each group of insurance customers having common characteristics and/or insurance policy preferences may be presented to potential bidders (e.g., to at least some of the plurality of insurance providers 16-1 to 16-N) via an electronic or online auction. For instance, the one or more processors, computing devices or servers may cause a particular insurance group associated with a given group of insurance customers (characterized by customer characteristics, insurance policy preferences, and/or telematics data, for instance) to be presented and/or offered for sale on remote display screens (such as via the internet or a secure communications network) of at least some of the insurance provider systems 16-1 to 16-N. Additionally or alternatively, an indication of the particular insurance group, the given group of insurance customers associated therewith, and/or an indication of the one or more individual preferences and/or characteristics based upon which the group was formed may be provided to the insurance provider systems 16-1 to 16-N, and the insurance provider systems 16-1 to 16-N may generate their respective bids based upon this information.

The method 400 may include (e.g., via the one or more processors, computing devices or servers), receiving and/or comparing one or more bids 408. Bidders for the various groups of similarly situated and/or like-minded insurance customers (such as grouped by low or medium risk drivers, insureds with the same preferences for deductibles or coverages, insureds having similar driving behaviors (as evidenced by telematics data), etc.) may submit their bids via remote computers. The bids may be received by a processor or server associated with the entity running the auction via wireless or wired communication and/or data transmission.

The method 400 may include, via the one or more processors, accepting a respective bid for purchase and/or offer for sale for one or more of the insurance policy groups or groupings 409. For example, an accepted or winning bid may be determined based upon one or more criteria, such as cost, overall match to affinity group members (e.g., based upon customer characteristics, insurance policy preferences, and/or telematics data, for instance), and/or other criteria. In one embodiment, the accepted or winning bid may be determined based upon a prioritization of the one or more criteria. In some cases, upon acceptance of a winning bid, the method 400 may include updating existing insurance policies, rates, premiums, discounts, etc. and/or providing new insurance policies to consumers associated with the affinity group based upon the winning bid. The updates to existing insurance policies and/or the establishment of new insurance policies may provide lower cost insurance to the respective insureds, e.g., to at least some of the consumers associated with the affinity group. Further, the updates to the existing insurance policies and/or the establishment of the new insurance policies may be more reflective of the actual risk (or lack thereof) to at least some respective insureds than were their previous insurance policies (if any). Still further, the updates to the existing insurance policies and/or the establishment of the new insurance policies may be more reflective of the updated or changed preferences and/or the characteristics of at least some of the individual insurance customers associated with the affinity group.

The method 400 may include, via the one or more processors, computing devices or servers, notifying insurance customers of new insurance policies, premiums, rates, discounts, etc. 410. As previously discussed, after a winning bid has been determined or selected 409, new insurance policies, rates, premiums, discounts, etc. may be determined or updated. New insurance policies and associated information may be communicated to the insureds that may be impacted by the auction, such as notified of reduced premiums and/or increased discounts (such as increased discounts for low risk driving behavior).

The method 400 may include, via the one or more processors, computing devices or servers, automatically detecting driving events or other events that may impact a risk associated with a customer 412, e.g., risk-impacting events. Over time, risk associated with each customer may change. For example, a customer may engage in low risk behavior, and/or may not be involved with automobile accidents, and/or may not report any insurance claims. On the hand, another customer may be involved in a high number of automobile accidents and/or otherwise engage in risky driving behavior. As a result, risk associated with various customers (or risk scores) may be lowered or increased over time based upon data analysis by one or more processors, such as by a processor associated with an insurance provider and with the permission of the insured. For instance, insureds engaging in low-risk behavior may desire for their information to be analyzed by an insurance provider to achieve a discount on various insurance products. The data may be gathered by one or more processors, such as gathered from a customer profile and/or from third party sources, such as a DMV (Department of Motor Vehicles). Additionally or alternatively, the data may be telematics data that is gathered by a mobile device (e.g., smart phone) and/or a conventional telematics device that plugs into an electrical or computer system of a vehicle, or otherwise physically connects to a vehicle.

The method 400 may include, via the one or more processors, computing devices or servers, updating the customer's risk score and/or customer profile 414. Based upon the data gathered and/or collected by one or more processors, each customer's profile, risk profile, and/or risk score may be updated to reflect low or high-risk behavior. Additionally or alternatively, a customer's profile may reflect more recent or changed customer preferences for various insurance policy coverages, deductibles, limits, etc. The customer profile may also be updated to reflect more recent or current customer preferences for various types of insurance or insurance products that the customer may be interested in, such as life or health insurance, or renters versus home insurance. The customer profile may be updated to reflect changed customer characteristics, e.g., changes in address, income, age, etc. As another example, a customer's risk score or profile for automobile insurance may be updated based upon a lack of accidents for a given period of time, and/or involvement in one or more vehicle accidents. The cause of the vehicle accidents may also be factored into the risk score and/or customer profile.

The method 400 may include, via the one or more processors and based upon the updated customer risk score and/or profile, updating the customer group and/or moving the customer to a new group 416. For instance, based upon a customer's updated profile and/or risk score, an individual customer may be moved to or associated with, via one or more processors, a new or different customer group or segment. Additionally or alternatively, based upon a customer's most recent preferences for insurance policy coverages, deductibles, or limits, and/or types of insurance products, an individual customer may be moved or re-assigned to, by the one or more processors, a new or different customer group or segment.

The method 400 may include, via the one or more processors, computing devices or servers, after a number of customers have been moved to new or different risk-based groups, having or holding another auction of the new or updated groups 406, and then the process may continue (as shown in FIG. 3). For instance, after a number of customers have been moved to a new or different group of insurance customers based upon their changed personal characteristics (education, marital status, age, driving record or history, etc.) and/or changed insurance policy preferences (new interest in life or health insurance, new interest in home owners insurance, changed policy deductibles or coverages, interest in using telematics devices and/or gathering telematics data, etc.), a new electronic or online auction of the new, or revised/updated group of insurance policies associated with those insurance customers for which personal characteristics and/or insurance policies have changed may be held, such as under the direction of one or more processors.

V. Exemplary Method of Auctioning Insurance Policies

In one aspect, a computer-implemented method of auctioning groups of insurance policies via an electronic or communications network may be provided. The method may include: (1) analyzing, via one or more processors, multiple insurance applications, accounts, and/or policies for individual insurance policy preferences and/or individual characteristics of multiple customers or consumers; (2) dividing or segmenting, via the one or more processors, the multiple customers or consumers into various insurance groups, groupings, or segments based upon the individual insurance policy preferences and/or characteristics; (3) auctioning, via the one or more processors, such as via one or more electronic or communications networks, the opportunity to provide insurance for one or more of the various insurance groups or segments; (4) receiving, via the one or more processors, bids for purchase and/or offers of insurance for one or more of the various insurance groups; (5) accepting, via the one or more processors, one of the bids for purchase and/or offers; and/or (6) updating, via the one or more processors, existing insurance policies and/or establishing new insurance policies for at least some of the insureds associated with an insurance policy group corresponding to the accepted bid, thereby providing lower cost insurance and/or insurance more reflective of actual risk, or lack thereof, to the at least some of the insureds. The method may include additional, fewer, or alternate actions, including those discussed elsewhere herein.

For instance, the individual insurance policy preferences may include individual consumer preferences for insurance policy coverages, deductibles, limits, term lengths, and/or other insurance parameters; and the insurance groups or segments each may be associated with automobile, life, health, renters, home, pet, and/or burial insurance. The individual insurance policy preferences may include individual consumer preferences for claims expectations, telematics use, and/or insurance company ratings, in one embodiment.

The individual consumer characteristics may relate to a consumer's age, account and/or policy status, marital status, education, occupation, finances or income, driving history, accident history, vehicle type, home type, geographical location (state or city), risk, risk scores, and/or other individual characteristics. Additionally or alternatively, the consumer characteristics may relate to individual driving behavior that is based upon computer analysis of telematics data. The telematics data may be associated with an individual driver or insured, and/or may be gathered or collected from a mobile device or conventional telematics device that plugs into or otherwise is communicatively connected to an electrical or computer system of a vehicle associated with the individual driver or insured.

The method may further include detecting an event, or lack thereof, that impacts a risk or risk score of an insured, such as by accessing a third party or government database over a communication network and/or by analyzing telematics data corresponding to the insured. The risk score may be stored, for example, in a consumer profile of the insured. The method may also include (i) updating the consumer profile and/or the risk score of an insured based upon the detected event; (ii) updating the insurance policy group or grouping to which the insured belongs or reassigning the insured to another insurance policy group based upon the updated consumer profile or risk score, and/or (iii) offering for auction the opportunity to provide insurance for the updated or another insurance group.

VI. Exemplary Systems for Auctioning Insurance Policies

In one aspect, a system, e.g., for auctioning insurance policies, may be provided. The system may include one or more persistent memories storing a consumer profile database including a plurality of consumer profiles; one or more communication interfaces to communicate with remote devices via one or more networks; and one or more processors. The system may also include one or more non-transitory, computer-readable or computer-executable media storing instructions thereon. The instructions, when executed by the one or more processors, may cause the system to analyze stored consumer profiles of multiple insurance consumers to discover or determine consumer insurance policy preferences and/or consumer characteristics. For example, the consumer insurance policy preferences may include individual consumer preferences for insurance policy coverages, insurance policy deductibles, insurance policy limits, claims expectations, telematics use, insurance parameters, and/or insurance company ratings; and the multiple insurance consumers (and their respective applications, accounts, and/or policies) may be associated with automobile, life, health, renters, home, pet, and/or burial insurance. Additionally or alternatively, the consumer characteristics may relate to or be indicative of consumer age, account status, marital status, education, occupation, finances or income, driving history, accident history, vehicle type, home type, location (e.g., state or city), risk, risk scores, and/or other factors. For example, the consumer characteristics may relate to or be indicative of individual driving behavior that is based upon computer analysis of telematics data, where the telematics data may be associated with a particular driver or insured, and the telematics data may be gathered or collected from mobile device or conventional telematics device that plugs into or is otherwise communicatively connected to an electrical or computer system of a vehicle corresponding to the particular driver or insured.

Further, the instructions, when executed by the one or more processors, may cause the system to divide or segment the multiple insurance consumers into various insurance policy groups or groupings based upon the individual/consumer insurance policy preferences and/or individual/consumer characteristics; auction (such as via an electronic or communications network using the one or more communication interfaces) the opportunity to provide insurance to consumers included in one or more of the various insurance policy groups or groupings; receive bids for purchase and/or offers for insurance for one or more of the various insurance policy groups or groupings; accept one of the bids for purchase and/or offers for insurance; and/or update insurance policies for at least some of the insureds associated with a particular insurance policy group corresponding to the accepted bid, and/or establish new insurance policies for at least some of the insureds associated with the particular insurance policy group, thereby providing lower cost insurance and/or insurance that is more reflective of actual risk, or lack thereof, to one or more insureds associated with the particular insurance policy group.

In one embodiment, the system may include further instructions stored on the computer-readable or computer-executable media that, when executed by the one or more processors, may cause the system to detect an event (or lack thereof) that impacts a risk score of a particular insured, for example, by accessing a third party or government database over a communication network, and/or by analyzing telematics data. In some cases, the further instructions, when executed, may cause the system to update the risk score of the particular insured and/or update a consumer profile of the particular insured in which the risk score is stored, e.g., based upon the detected event or lack thereof; update, based upon the updated consumer profile or risk score for the particular insured, the insurance policy group or grouping to which the particular insured belongs; and/or offer for auction the opportunity to provide insurance for the insurance policy group or grouping that includes a particular insured with the updated consumer profile or risk score. The system may include additional, fewer, or alternate elements or components, including those discussed elsewhere herein.

In another aspect, a system (e.g., for auctioning insurance policies) may be provided. The system may include one or more persistent memories or data storage devices storing a consumer profile database including a plurality of consumer profiles, and one or more communication interfaces to communicate with remote devices via one or more networks.

The system may include a consumer grouping unit configured to group or segment consumer profiles that are stored in the consumer profile database and that correspond to multiple insurance consumers, applications, accounts, and/or policies. The grouping or segmenting performed by the consumer grouping unit may be based upon insurance policy preferences and/or consumer characteristics of individual consumers, and one or more insurance policy groups or segments may be formed. For example, the insurance policy preferences may include individual consumer preferences for insurance policy coverages, insurance policy deductibles, insurance policy limits, claims expectations, telematics use, and/or insurance company ratings. The multiple insurance consumers, applications, accounts, and/or policies may be associated with the vehicle, life, health, renters, home, pet, and/or burial insurance. Additionally or alternatively, the consumer characteristics may relate to or may be indicative of consumer age, account or policy status, marital status, education, occupation, finances or income, driving history, accident history, vehicle type, home type, location (e.g., state or city), risk, risk scores, and/or other factors. For example, the consumer characteristics may relate to or may be indicative of individual driving behavior that is based upon computer analysis of telematics data. The telematics data may be associated with an individual driver or insured, and/or may be gathered or collected from a mobile device or conventional telematics device that is plugged into or otherwise communicatively connected to an electronics or computer system of a vehicle corresponding to the individual driver or insured.

The system may include a policy procurement unit that is configured to auction or offer for sale (e.g., by using the one or more communication interfaces and one or more electronic or communications networks) an opportunity to provide insurance for consumers associated with a particular insurance policy group, and/or to cause information about the insurance policy preferences and/or consumer characteristics associated with the consumers associated with the particular insurance policy group to be remotely displayed on one or more computer screens for view by potential bidders (e.g., by using the one or more communication interfaces and one or more electronic or communications networks). The policy procurement unit may further be configured to receive bids for purchase and/or offers of insurance for the particular insurance policy group, accept one of the bids for purchase and/or offers of insurance for particular the insurance policy group, and/or update existing insurance policies and/or establish new insurance policies for insureds associated with the particular insurance policy group, thereby facilitating providing lower cost insurance to at least some of the insureds, and/or providing insurance to at least some of the insureds that is more reflective of (i) actual risk (or lack thereof) of the insureds, (ii) the current insurance policy preferences of the insurance, and/or (iii) the current consumer characteristics of the insurance.

In some embodiments, the system may be further configured to detect an event (or lack thereof) that may impact a risk score of a particular insured, for example, by accessing a third party or government database over communications network, and/or by analyzing telematics data. Additionally, the system (e.g., the consumer grouping unit and/or other suitable unit) may be configured to (i) update a consumer profile or a risk score of the particular insured based upon the detected event (or lack thereof), and/or (ii) update the insurance policy group or grouping to which the particular insured belongs, where the updating of the insurance policy group or grouping is based upon the updated consumer profile or risk score for the particular insured. Additionally or alternatively, the policy procurement unit (and/or other suitable unit) may be further configured to offer for auction the opportunity to provide insurance for members of the insurance policy group or grouping that includes the particular insured with the updated consumer profile or risk score. The system may include additional, fewer, or alternate elements or components, including those discussed elsewhere herein.

VII. Exemplary Usage-Based Insurance

Figure 4:
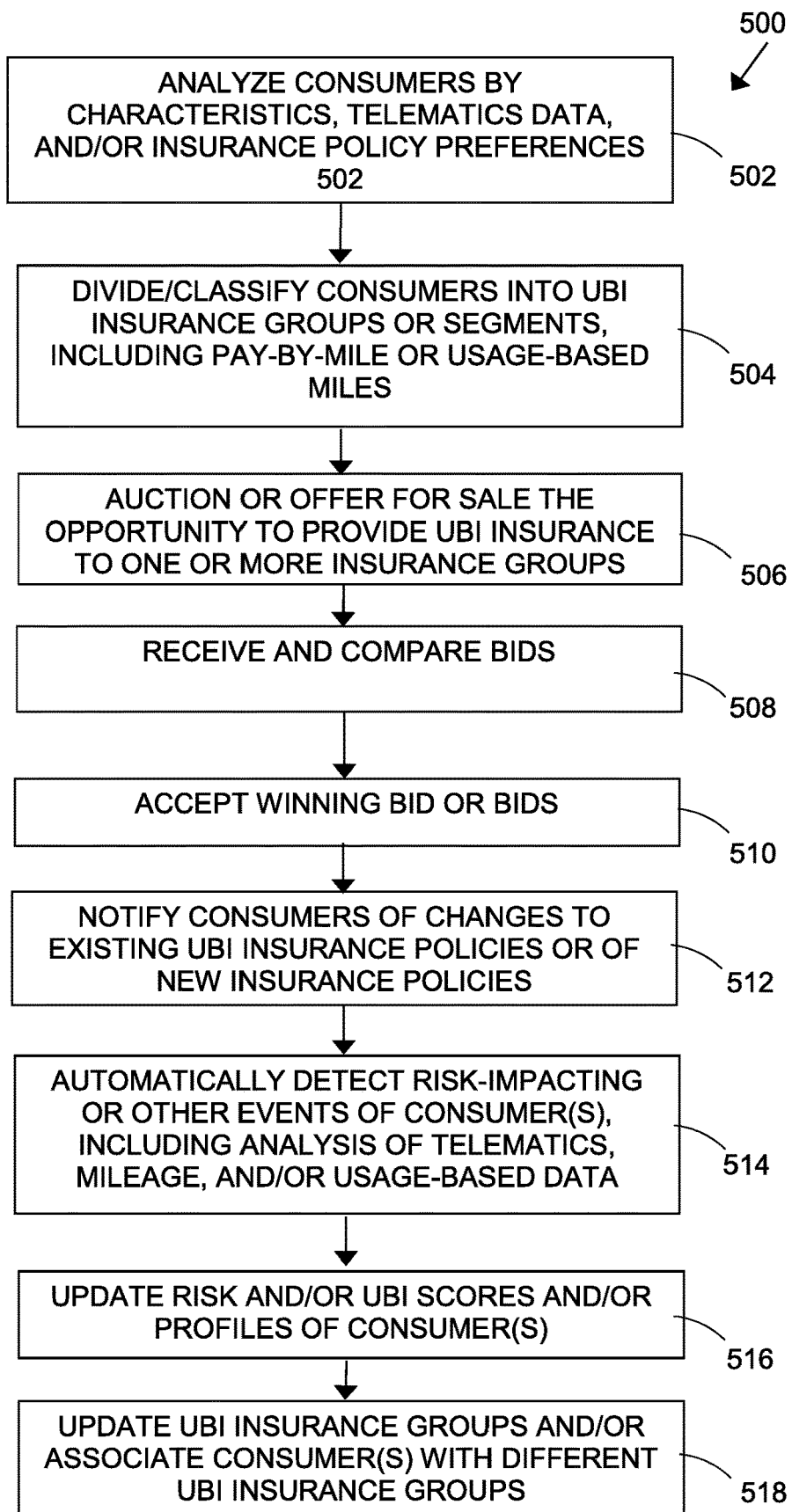
FIG. 4 depicts an exemplary computer-implemented method of auctioning groups or bundles of usage-based insurance (UBI) policies.

FIG. 4 illustrates an exemplary computer-implemented method for auctioning groups of insurance policies 500 or providing insurance to groups of similarly situated consumers or customers. In one embodiment, at least a portion of the method 500 may be performed by the system 10 of FIG. 1 and/or by the computer system 300 of FIG. 2. The method 500 may include, via one or more processors, computing devices, or servers: analyzing a set of insurance customers by their individual characteristics, telematics data, and/or insurance policy preferences 502; dividing and/or classifying the set of insurance customers into UBI (Usage-Based Insurance, such as pay-by-mile or pay-by-time) groups or segments based upon the customers' individual UBI characteristics and/or preferences 504; auctioning or offering for sale the opportunity to provide insurance to one or more UBI groups 506; receiving and comparing one or more UBI bids 508; accepting one or more winning UBI bids 510; and/or notifying insurance customers of new UBI policies and/or changes to existing UBI policies, premiums, discounts, coverages, deductibles, limits, conditions, terms, etc. 512.

The method 500 may further include automatically detecting driving events or other events that may impact a risk score and/or a customer profile of a customer associated with a particular UBI group or segment 514, which may include analysis of telematics or driving behavior data (cornering, braking, speed, and/or acceleration telematics data) associated with the customer or the customer's vehicle; updating the customer's risk score or UBI profile 516; and/or updating the particular UBI group or segment with which the customer and/or vehicle is associated, and/or moving the customer and/or vehicle to be associated with another UBI group or segment 518. After a number of customers and/or vehicles have been moved to new or different UBI-related groups or segments, another auction of the new or updated groups may be held 506, the process may continue 508, 510, 512, 514, 516, 518, etc. The method may include additional, fewer, or alternate actions, including those discussed elsewhere herein.

In one aspect, a computer-implemented method for providing UBI (Usage-Based Insurance) may be provided. The method may include (1) analyzing or electronically searching, via one or more processors, multiple insurance applications, accounts, and/or policies for at least one UBI (Usage-Based Insurance) preference or characteristic of multiple individuals and/or consumers corresponding to the multiple insurance applications, accounts, and/or policies; (2) dividing or segmenting, via the one or more processors, the multiple individuals and/or consumers into multiple UBI policy groups or segments based upon the at least one UBI preference or characteristic of the multiple individuals and/or consumers; (3) auctioning, via the one or more processors and by using an electronic or communications network, an opportunity to provide UBI for one or more of the multiple UBI policy groups or segments; (4) receiving, via the one or more processors and the electronic or communications network, one or more bids for purchase and/or offers of UBI for the one or more of the multiple UBI policy groups or segments; (5) accepting, via the one or more processors, one of the bids for purchase and/or UBI offers; and/or (6) updating or providing, via the one or more processors, UBI policies for insureds associated with a particular UBI policy group or segment corresponding to the accepted bid, thereby providing lower cost insurance and/or UBI that is more reflective of actual risk, or lack thereof, to the insureds associated with the particular UBI policy group or segment. The method may include additional, less, or alternate actions, including those discussed elsewhere herein.

For instance, the at least one UBI preference of the multiple individuals and/or consumers may include preferences for at least one of insurance policy coverage, types of coverages, premiums, discounts, deductibles, limits, conditions, or other terms; and the particular UBI policy group or segment may be associated with automobile UBI. The at least one UBI preference of the multiple individuals and/or consumers may include preferences for pay-by-mile auto insurance; and the particular UBI policy group or segment may be associated with automobile UBI. Additionally or alternatively, the at least one UBI preference of the multiple individuals and/or consumers may include preferences for pay-by-time (or pay by period of time) auto insurance; and the particular UBI policy group or segment may be associated with automobile UBI. The at least one UBI preference of the multiple individuals and/or consumers may include preferences for at least one of claims expectations, telematics use, or insurance company ratings.

The at least one UBI characteristic of the multiple individuals and/or consumers may relate to, or be indicative of, at least one of consumer age, status, marital status, education, occupation, finances or income, driving history, accident history, vehicle type, home type, geographic location, risk, risk scores, or another individual characteristic.

The at least one UBI characteristic of the multiple individuals and/or consumers may relate to, or be indicative of, individual driving behavior that is based upon computer analysis of telematics data; and the telematics data associated with a particular driver, insured, or vehicle may be gathered or collected from a mobile device or from a conventional telematics device that physically connects with a vehicle corresponding to the particular driver, insured, or vehicle.

In another aspect, a computer system configured for providing UBI may be provided. The system may include one or more communication interfaces configured to communicate with remote devices via one or more electronic or communications networks; one or more processors; and one or more non-transitory, computer-readable media storing instructions that, when executed by the one or more processors, cause the system to: (1) analyze consumer profiles that are included in the consumer profile database and that correspond to multiple insurance consumers for at least one UBI (usage-based insurance) preference or characteristic of the multiple insurance consumers; (2) divide or segment the multiple UBI consumers into multiple UBI policy groups or groupings based upon the at least one UBI preference or characteristic of the multiple insurance consumers; (3) auction, via the one or more electronic or communications network and by using the one or more communication interfaces, an opportunity to provide UBI for one or more of the multiple UBI policy groups or groupings; (4) receive, at the one or more communication interfaces, one or more bids for purchase and/or offers for UBI for the one or more of the multiple UBI policy groups or groupings; (5) accept one of the bids for purchase and/or offers for UBI for the one or more of the multiple UBI policy groups or groupings; and/or (6) update existing UBI policies or provide new UBI policies for insureds associated with a particular UBI policy group or grouping corresponding to the accepted bid, thereby providing lower cost insurance and/or UBI that is more reflective of actual risk, or lack thereof, to the insureds associated with the particular insurance policy group or grouping. The computer system may include additional, less, or alternate functionality, including that discussed elsewhere herein.

VIII. Exemplary Autonomous Vehicle Embodiments

Figure 5:
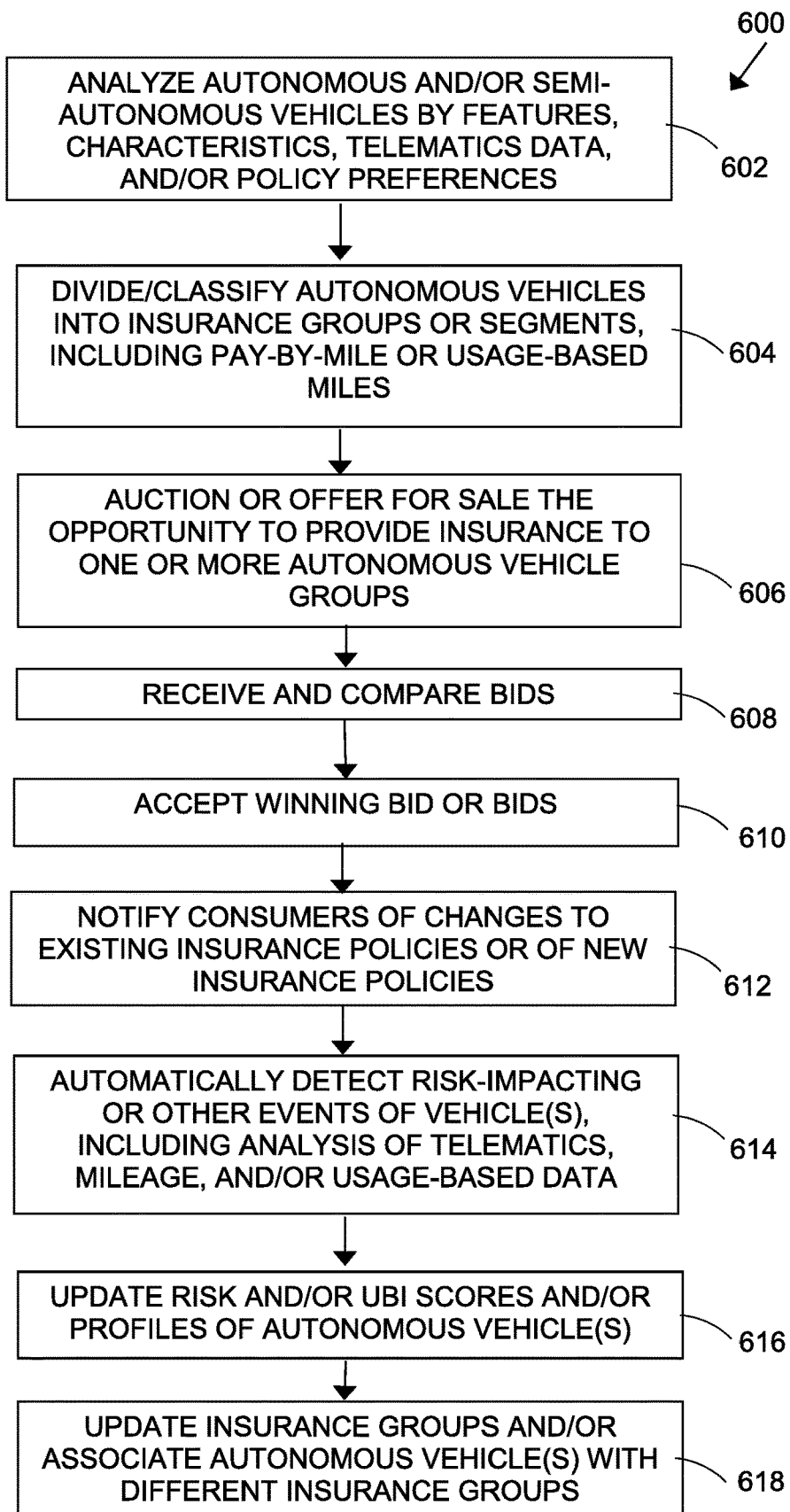
FIG. 5 depicts an exemplary computer-implemented method of auctioning groups or bundles of autonomous vehicle insurance policies.

FIG. 5 illustrates an exemplary computer-implemented method for auctioning groups of insurance policies 600 or providing insurance to similarly situated groups of consumers or autonomous vehicles (AV). In one embodiment, at least a portion of the method 600 may be performed by the system 10 of FIG. 1 and/or by the computer system 300 of FIG. 2. The method 600 may include, via one or more processors, computing devices, or servers: analyzing a set of insurance customers, or autonomous vehicles (AVs) or semi-autonomous vehicles, by their individual characteristics and/or insurance policy preferences 602. For instance, autonomous vehicles or customers may be grouped by autonomous or semi-autonomous features or technologies, telematics data, and/or policy preferences, including UBI preferences.

The method 600 may include dividing and/or classifying the set of insurance customers and/or autonomous vehicles into groups or segments based upon the customers' individual characteristics and/or preferences (including preferences for AV, AV features, and/or UBI), and/or the autonomous vehicles features or characteristics 604; auctioning or offering for sale the opportunity to provide insurance to one or more autonomous vehicle-related groups 606 (e.g., groups of autonomous vehicles, and/or groups of customers that own, or use, autonomous vehicles); receiving and comparing one or more bids 608 for insurance covering multiple autonomous vehicles; accepting one or more winning bids 610; and/or notifying insurance customers and/or autonomous vehicles of new AV insurance policies and/or changes to existing AV insurance policies, coverages, premiums, discounts, deductibles, etc. 612; automatically detecting driving events or other events that may impact a risk score and/or a customer profile of a customer and/or vehicle associated with a particular insurance group or segment 614 (which may include analysis of telematics data associated with a customer or an autonomous vehicle); updating the customer's or vehicle's risk score or AV-related profile 616; and/or updating the particular insurance group or segment with which the customer and/or vehicle is associated, and/or moving the customer and/or vehicle to be associated with another group or segment 618.

After a number of customers and/or autonomous vehicles have been moved to new or different AV-related groups or segments, another auction of the new or updated AV groups may be held 606, the process may continue 608, 610, 612, 614, 616, 618, etc. The method may include additional, fewer, or alternate actions, including those discussed elsewhere herein.

In one aspect, a computer-implemented method for providing auto insurance covering multiple autonomous vehicles may be provided. The method may include (1) analyzing, via one or more processors, multiple insurance applications, accounts, and/or policies for at least one Autonomous Vehicle (AV) preference or characteristic of multiple individuals and/or autonomous vehicles corresponding to the multiple insurance applications, accounts, and/or policies; (2) dividing or segmenting, via the one or more processors, the multiple individuals and/or autonomous vehicles into multiple AV (Autonomous Vehicle) policy groups or segments based upon the at least one AV preference or characteristic of the multiple individuals and/or autonomous vehicles; (3) auctioning, via the one or more processors and by using an electronic or communications network, an opportunity to provide autonomous vehicle insurance for one or more of the multiple AV policy groups or segments; (4) receiving, via the one or more processors and the electronic or communications network, one or more bids for purchase and/or offers of autonomous vehicle insurance for the one or more of the multiple AV policy groups or segments; (5) accepting, via the one or more processors, one of the bids for purchase and/or autonomous vehicle insurance offers; and/or (6) updating or providing, via the one or more processors, autonomous vehicle insurance policies for insureds and/or autonomous vehicles associated with a particular AV policy group or segment corresponding to the accepted bid, thereby providing lower cost insurance and/or autonomous vehicle insurance that is more reflective of actual risk, or lack thereof, to the insureds (and/or for the vehicles) associated with the particular AV policy group or segment.

The at least one AV preference of the multiple individuals and/or autonomous vehicles may include preferences for at least one of insurance policy coverage, types of coverages, premiums, discounts, deductibles, conditions, limits, or other terms; and the particular AV policy group or segment may be associated with AV auto insurance. Additionally or alternatively, the at least one AV preference of the multiple individuals and/or autonomous vehicles may include preferences for pay-by-mile auto insurance; and/or the particular AV policy group or segment may be associated with AV auto insurance.

The at least one AV preference of the multiple individuals and/or autonomous vehicles may include preferences for autonomous or semi-autonomous features or technologies, including one or more of: vehicle self-braking, self-driving, lane centering, cruise control, collision avoidance, and blind spot monitoring; and/or the particular AV policy group or segment is associated with AV automobile insurance. The at least one AV preference of the multiple individuals and/or autonomous vehicles include preferences for at least one of claims expectations, telematics use, or insurance company or provider ratings. The method may include additional, less, or alternate actions, including those discussed elsewhere herein.

In another aspect, a computer system configured for providing auto insurance covering multiple autonomous vehicles may be provided. The method system may include a persistent memory storing a consumer profile database; one or more communication interfaces configured to communicate with remote devices via one or more electronic or communications networks; one or more processors; and/or one or more non-transitory, computer-readable media storing instructions that, when executed by the one or more processors, cause the system to: (1) analyze consumer or autonomous vehicle profiles that are included in the consumer profile database and that correspond to multiple insurance consumers and/or autonomous vehicles for at least one AV preference or characteristic of the multiple insurance consumers; (2) divide or segment the multiple insurance consumers into multiple AV policy groups or groupings based upon the at least one AV preference or characteristic of the multiple insurance consumers; (3) auction, via the one or more electronic or communications network and by using the one or more communication interfaces, an opportunity to provide AV insurance for one or more of the multiple AV policy groups or groupings; (4) receive, at the one or more communication interfaces, one or more bids for purchase and/or offers for AV insurance for the one or more of the multiple AV policy groups or groupings; (5) accept one of the bids for purchase and/or offers for AV insurance for the one or more of the multiple AV policy groups or groupings; and/or (6) update existing AV insurance policies or provide new AV insurance policies for insureds and/or autonomous vehicles associated with a particular AV policy group or grouping corresponding to the accepted bid, thereby providing lower cost insurance and/or AV insurance that is more reflective of actual risk, or lack thereof, to the insureds associated with the particular AV insurance policy group or grouping. The system may include additional, less, or alternate functionality, including that discussed elsewhere herein.

IX. Exemplary Auction Embodiments

Figure 6:
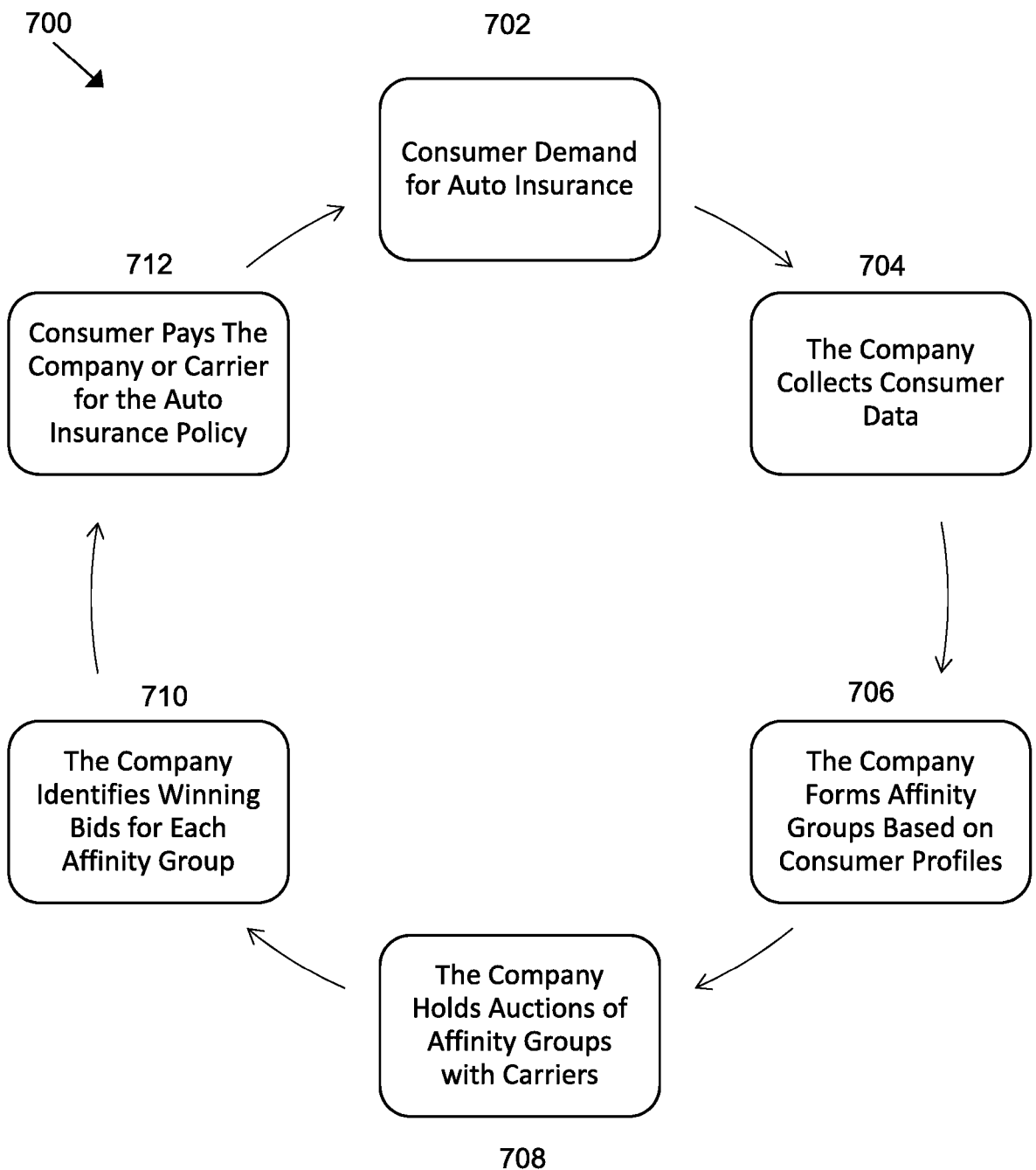
FIG. 6 depicts an exemplary computer-implemented method of auctioning groups or bundles of insurance policies.

FIG. 6 depicts an exemplary computer-implemented method of auctioning groups or bundles of insurance policies 700. The method 700 may include, via one or more processors associated with an insurance provider or other entity, determining consumer demand for auto insurance 702; collecting consumer data 704, such as with consumer permission or affirmative consent; forming one or more affinity groups based upon consumer profiles 706 and/or the data collected; holding one or more auctions of affinity groups with multiple insurance carriers or providers, such as via wireless communication or data transmission over one or more radio links or communication networks 708; identifying a winning bid or winning bids for each affinity group 710; and/or receiving payment from consumers at the original entity organizing or running the electronic auction and/or at the multiple insurance carriers 712. The electronic auctions may be periodically repeated, such as every 6 or 12 months. The method may include additional, less, or alternate actions, including those discussed elsewhere herein.

For instance, consumers may go online to complete an auto insurance "like" application hosted by an entity ("Company") that organizes an electronic insurance auction for blocks of similarly situated customers or vehicles. Based upon the contents of the application, individuals (or even vehicles) may be segmented into groups, such as in groups of similarly situated individuals, or vehicles. These groups may be defined by any of the following criteria: behavioral and attitudinal segmentation; demographics; geography (such as by state or city of residence); occupation; risk characteristics; claims and claims expectations; insurance company ratings (AAA); telematics data; insurance status; driving record; homeowner status; vehicle count; driver gender; existing carrier; preference for an agent or direct relationship (or other sales/relationship preference); pay as you drive insurance (or other UBI); telematics based insurance (e.g., device type); zip code; day time or time-of-day usage; autonomous car insurance; autonomous vehicle features or technologies; vehicle safety features; vehicle make and model; vehicle age; types of insurance coverage, limits, premiums, rates, discounts, conditions, or terms; and/or other criteria, including those discussed elsewhere herein.

Based upon these segmentation criteria, once a group of consumers reaches a certain membership or size, the auctioneer entity or Company may consider the group like an affinity group. Recognizing there are hundreds of ways to segment consumers based upon the above criteria, it may be likely that the Company may have hundreds of affinity groups that they may be accountable for securing auto insurance coverage for.

Within a given period of time or window of time, Company may present the affinity group to a number of auto insurance companies for auto insurance coverage through an auction like process. At this point, Company may hold an auction where the auto insurance carriers will be permitted to bid on providing auto insurance to the affinity group.

The auto insurance carrier that bids to provide auto insurance to the affinity group for the lowest amount of money, based upon the requirements, profile or specifications of the affinity group, that auto insurance carrier will receive the contract to provide auto insurance to the affinity group (its members) for a set period of time or a specific term (e.g., six months or a year). During this period of time, the members of the affinity group may have their checking accounts or credit cards debited periodically, by either Company or the auto insurance carrier that provides the auto insurance, for the payment of their auto insurance coverage. Additionally or alternatively, alternate means of electronic fund transfers may be utilized.

Prior to the conclusion of the auto insurance policy's term or length, Company may automatically conduct another auction for the affinity group to ensure its members are always receiving the most competitively priced auto insurance coverage. In other words, the consumer or affinity group member may never have to shop for auto insurance again as Company may take on this responsibility for the consumer.

Some of the benefits or pricing discounts the members of the affinity group earn, such as loyalty or accident free discounts, may become a part of the profile of the group and be priced into the future cost of the affinity group's auto insurance. Likewise, if a member or vehicle of the affinity group is involved in a driving violation or accident, this may result in the member or vehicle being moved to another affinity group (which this member aligns to better). Depending on demand for this service, Company could form and shop affinity groups on a daily/periodic basis. Further, as blockchain technologies or techniques become more readily available or feasible, Company may employ one or more blockchains to issue, maintain, and update insurance policies, as well as conduct, and record the results of, electronic auctions for blocks of similarly situated insureds or vehicles.

Figure 7:
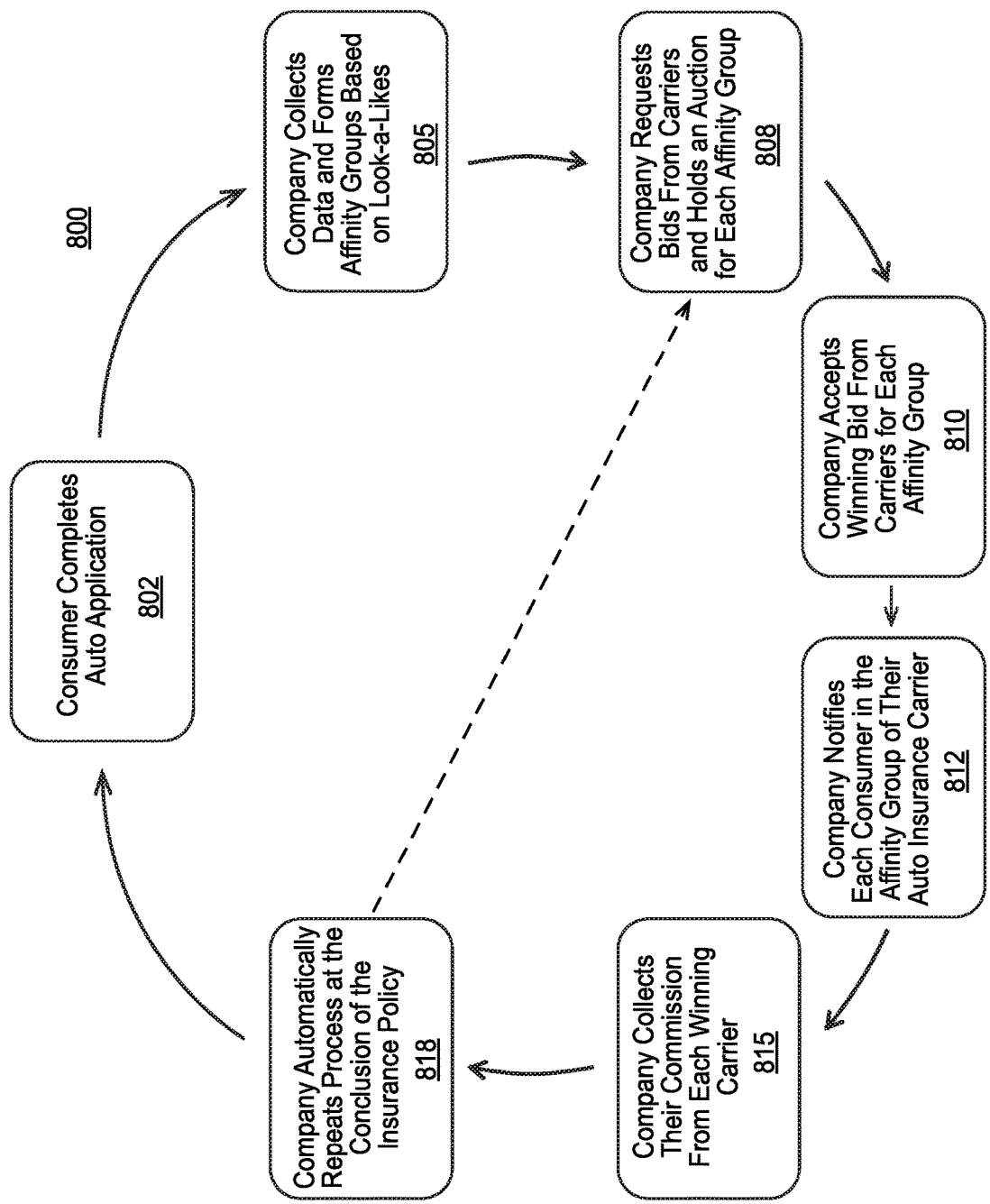
FIG. 7 depicts an exemplary computer-implemented of auctioning groups of bundles of insurance policies.

FIG. 7 depicts an exemplary computer-implemented method of auctioning groups or bundles of insurance policies 800. The method 800 may include, via one or more processors associated with an insurance provider or other entity, receiving a plurality of completed applications for auto insurance from a set of consumers (e.g., customers or potential customers) 802; forming one or more affinity groups within the set of consumers based upon the plurality of completed applications, e.g., based upon "look-a-like" applications or similar characteristics between various applications 805; holding a respective auction for each of the formed affinity groups with multiple insurance carriers or providers, such as via wireless communication or data transmission over one or more radio links or communication networks 808; for each affinity group auction, accepting a winning bid from a respective insurance carrier or provider 810; notifying each consumer included in each affinity group of the respective, winning insurance carrier or provider 812; and collecting a respective commission or fee from each winning insurance carrier or provider 815. The electronic auctions may be repeated 818, e.g., upon the expiration of one or more insurance policies associated with each affinity group. In one embodiment of repeating an electronic auction 818, the method 800 may proceed to holding one or more subsequent electronic auctions for one or more of the formed affinity groups 808, etc. In some embodiments of repeating an electronic auction 818, the method 800 may proceed to receiving a subsequent set of completed or updated applications from a subsequent set of consumers 802, where the subsequent set of consumers may at least partially overlap with the previous set of consumers; forming one or more subsequent affinity groups based upon the applications of the subsequent set of consumers 805, which may include re-forming one or more of the previously-formed affinity groups; holding a respective auction for each of the subsequently-formed affinity groups 808, etc. The method 800 may include additional, less, or alternate actions, including those discussed elsewhere herein.

For example, consumers may go online to complete an auto insurance-like application hosted by an entity ("Company"), where the auto insurance-like applications requests information or data similar to the information or data that is typically required for auto insurance applications. The Company may organize an electronic insurance auction for blocks or groups of similarly situated customers or vehicles, e.g., blocks or groups of look-a-likes, and the completed applications may be received by the Company. Contents, information, or data included in the received applications may be collected and analyzed, and based upon the analysis, various affinity groups may be formed from individuals (or even vehicles) associated with the received applications, such as groups of similarly situated individuals, or vehicles. These affinity groups may be defined by any of the following criteria: behavioral and attitudinal segmentation; demographics; geography (such as by state or city of residence); occupation; risk characteristics; claims and claims expectations; insurance company ratings (AAA); telematics data; insurance status; driving record; homeowner status; vehicle count; driver gender; existing carrier; preference for an agent or direct relationship (or other sales/relationship preference); pay as you drive insurance (or other UBI); telematics based insurance (e.g., device type); zip code; day time or time-of-day usage; autonomous car insurance; autonomous vehicle features or technologies; vehicle safety features; vehicle make and model; vehicle age; types of insurance coverage, limits, premiums, rates, discounts, conditions, or terms; and/or other criteria, including those discussed elsewhere herein. Recognizing there are hundreds of ways to group consumers based upon the above criteria, it may be likely that the Company may have hundreds of affinity groups for which the Company may be accountable for securing auto insurance coverage.

The Company may present each formed affinity group to a number of auto insurance providers, carriers, or companies for auto insurance coverage through an auction-like process. At this point, for each affinity group, Company may hold an auction where the auto insurance carriers will be permitted to bid on providing auto insurance to the affinity group (its members). Different affinity groups may be presented to different sets of auto insurance companies for auction, if desired.

For each affinity group auction, the auto insurance carrier that bids to provide auto insurance to the affinity group for the lowest amount of money, based upon the requirements, profile, or specifications of the affinity group, may receive or may be awarded the contract to provide auto insurance to the affinity group (its members) for a set period of time or a specific term (e.g., six months or a year). During this period of time, the members of the affinity group may have their checking accounts or credit cards debited periodically, by either Company or the auto insurance carrier that provides the auto insurance, for the payment of the premiums for their auto insurance coverage. Additionally or alternatively, alternate means of electronic fund transfers may be utilized.

Moreover, for each affinity group auction, the Company may collect a respective commission or fee from the auto insurance carrier that receives or is awarded the contract, e.g., from the winning auto insurance carrier. For example, an amount of a commission or fee for a particular auction may be electronically (and, in some scenarios, automatically) transferred from the winning insurance carrier or provider to the Company. In one embodiment, the amount of the commission or fee may be determined based upon the affinity group's premium, e.g., as a percentage of the affinity group's premium. In one embodiment, the amount of the commission or fee may be a flat administrative fee. Additionally, in some embodiments, each member of each affinity group may pay the Company a fee corresponding to the procurement of insurance for the member. For example, each member of each affinity group may pay the Company an annual or periodically assessed membership fee. The payment of the membership fee may be implemented via electronic funds transfer, for instance.

Prior to the conclusion of an auto insurance policy's term or length, e.g., upon or shortly before the expiration of the auto insurance policy, the Company may automatically conduct another auction for the affinity group, e.g., to ensure its members are always receiving the most competitively priced auto insurance coverage. The electronic auctions may be repeated, e.g., upon the expiration of one or more insurance policies associated with the affinity groups. In other words, a consumer or affinity group member may never have to shop for auto insurance again as Company may take on this responsibility for the consumer.

In some embodiments, prior to the conclusion of one or more auto insurance policies' term or length, e.g., upon or shortly before the expiration of one or more auto insurance policies, the Company may automatically form or re-form at least some of the affinity groups. For example, the Company may automatically form or re-form at least some of the affinity groups based upon a subsequent set of completed or updated applications from a subsequent set of consumers 802. In some scenarios, the subsequent set of consumers may at least partially overlap with the previous set of consumers from which the affinity groups were formed. A respective auction for each of the subsequently-formed affinity groups may be held (e.g., based upon the same criteria as the previously-formed affinity groups or based upon different criteria), and a corresponding contract may be awarded to each of the winning insurance companies or providers. The Company may collect respective commissions or fees from each of the winning insurance companies or providers, and insurance policies may be automatically enacted by the winning insurance companies or providers for members of the subsequently-formed affinity groups.

Some of the benefits or pricing discounts the members of an affinity group earn, such as loyalty or accident free discounts, may become a criteria based upon which subsequent affinity groups are formed or re-formed. Likewise, if a member or vehicle of the affinity group is involved in a driving violation or accident, this may result in the member or vehicle being moved to another affinity group (which this member aligns to better) during subsequent forming or re-forming of affinity groups. Depending on demand for this service, Company could form, re-form, and auction affinity groups on a daily/periodic basis in addition to alternatively to forming, re-forming, and auctioning affinity groups upon expiration of one or more insurance policies. Further, as blockchain technologies or techniques become more readily available or feasible, Company may employ one or more blockchains to issue, maintain, and update insurance policies, as well as form or re-form affinity groups; conduct, and record the results of, electronic auctions for affinity groups; and collect respective commissions or fees from winning insurance companies or providers.

The benefit to the members of each affinity group for such an arrangement may include the ability to buy auto insurance at the most competitive price available. In addition, participation in this program should take the "hassle" out of ever having to shop for auto insurance again, as this service may repeatedly do it automatically for its members, such as every six months. On the other hand, the benefit to the participating auto insurance carriers for such an arrangement may be the ability to attract large groups of consumers who may not have otherwise shopped/considered their company for auto insurance.

Figure 8A:
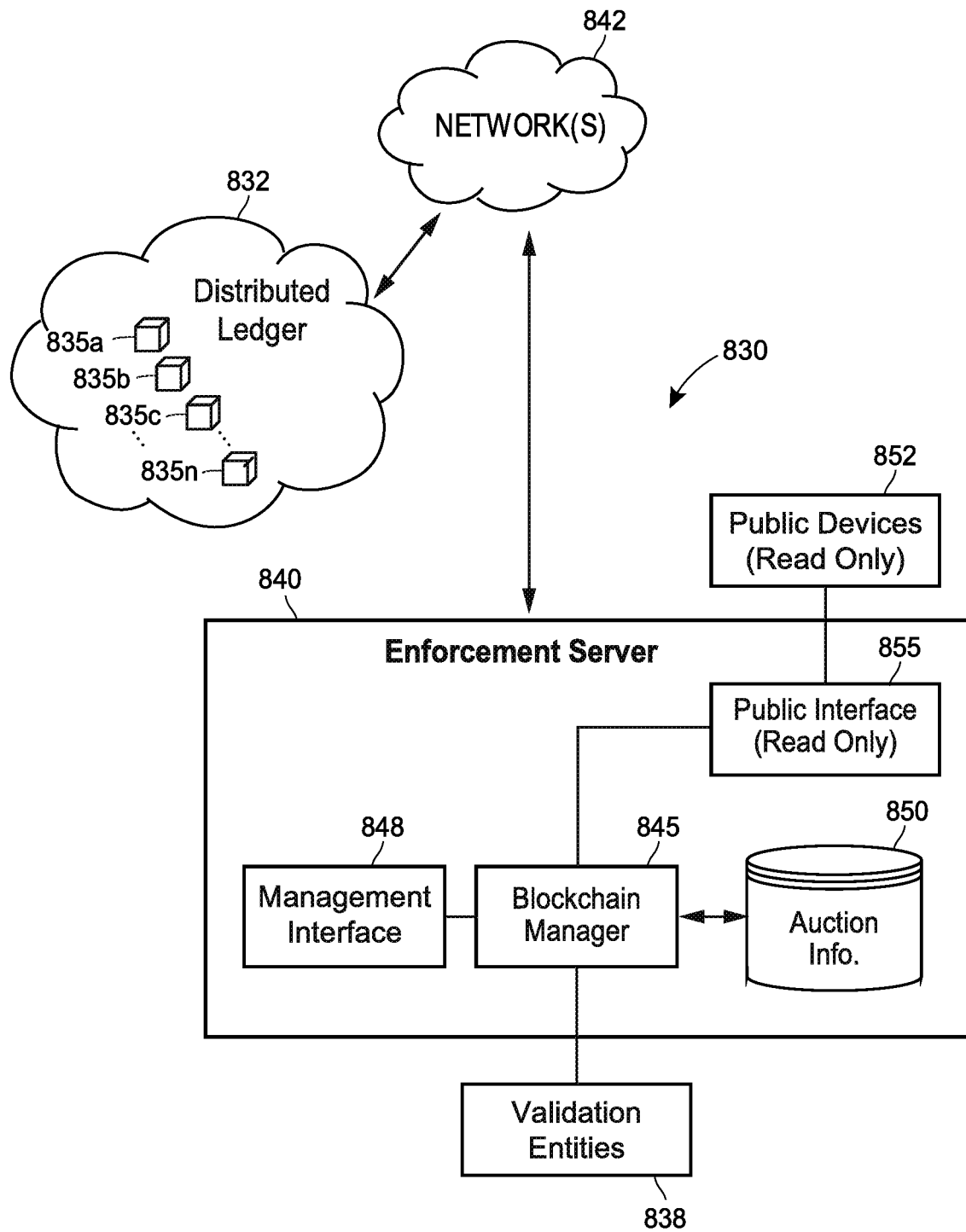
FIG. 8A depicts an exemplary blockchain environment in which the techniques described herein may be implemented, according to one embodiment.

X. Exemplary Blockchain Environment for Automatically Obtaining and/or Maintaining Insurance Coverage FIG. 8A depicts an exemplary blockchain environment 830 including components associated with obtaining and/or maintaining insurance coverage, according to one embodiment. It is noted that although FIG. 8A depicts certain entities, components, and devices, it should be appreciated that additional or alternate entities and components are envisioned. Generally speaking, though, the blockchain environment 830 may be configured and arranged to support and maintain a distributed ledger via which auctions of opportunities to provide insurance policies, e.g., to one or more affinity groups, may be conducted. As previously discussed, an affinity group may comprise a set of group members. The set of affinity group members may include a group of individuals or end-consumers, each of whom desires to procure insurance, in some implementations. In other implementations, the set of affinity group members may include a group of products and/or services (e.g., fractionally-used products or services, fractionally-owned products or services, etc.) that are provided by a company, business, or other organization, where the company, business, or other organization desires to procure insurance for its products and/or services. A "distributed ledger" may be a transactional record that is maintained at each node of a peer to peer network. Commonly, the distributed ledger is comprised of groupings of transactions bundled together or compiled into a "block." When a change to the distributed ledger is made (e.g., when a new transaction and/or block is created), each node must form a consensus as to how the change is integrated into the distributed ledger. Upon arriving at consensus, the agreed upon change may be pushed out or distributed to each node so that each node maintains an identical copy of the updated distributed ledger. Any change that does not achieve a consensus is ignored. Accordingly, unlike a traditional, centralized ledger, a single party cannot unilaterally alter the distributed ledger.

In an application of distributed ledgers, each new block may be cryptographically linked to the previous block in order to form a "blockchain." More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to aspects, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution also depends on the particular hash values for each transaction within the blockchain, if the solving node attempted to modify any transaction, the solution would not be verified by the other nodes. More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

As illustrated in FIG. 8A, the blockchain environment 830 associated with obtaining and/or maintaining insurance coverage may include a distributed ledger 832. The distributed ledger 832 may be maintained via a network of nodes, which may include one or more computing devices or networks 835a-835n associated with respective bidding entities, and/or may include an enforcement server 840. The nodes 835a-835n, 840 may have access to the distributed ledger 832 and/or may generate data included in the distributed ledger 832. As described above, in some embodiments, the distributed ledger 832 may not be changed without first forming or arriving at a consensus on the change. Accordingly, as depicted by FIG. 8A, the distributed ledger 832 may be considered separate from any individual node 835a-835n, 840, even though the individual nodes 835a-835n, 840 may store local copies of the distributed ledger 832. Generally speaking, the nodes 835a-835n, 840 may be interconnected via one or more networks 842, which may include one or more public networks (such as the Internet), and/or one or more private networks (such as private networks managed by bidding entities). The one or more networks 842 may utilize any suitable wired or wireless communications standard or technology (e.g., GSM, CDMA, TDMA, WCDMA, LTE, EDGE, OFDM, GPRS, EV-DO, UWB, IEEE 802 including Ethernet, WiMAX, and/or others).

According to certain aspects, the enforcement server 840 may be configured to compile new blocks to add to a blockchain and to administer one or more auctions of opportunities to provide insurance, e.g., to provide insurance for respective members of one or more affinity groups, and/or to administer or to cause the administration of one or more insurance policies corresponding to winning bids of auctions. Although FIG. 8A illustrates a single enforcement server 840, it should be appreciated that in some embodiments, the enforcement server 840 may be a plurality of interconnected servers, for example, in a cloud computing environment.

In one aspect, the enforcement server 840 may compile or combine a plurality of transactions received from the plurality of bidding entities 835a-835n into a new block. After the new block is compiled, the enforcement server 840 may transmit the new block to the plurality of bidding entities 835a-835n and/or to one or more dedicated validation entities 838 to generate a solution to incorporate the block into blockchain and/or to form or arrive at a consensus on the solution. For example, if a particular block includes transactions corresponding to the bidding actions (e.g., bids or no-bids) submitted by more than one of the bidding entities 835a-835n for a particular round of bidding of a particular auction, the solution may indicate the highest submitted bid amount for the particular round, and the blockchain may include blocks corresponding to multiple rounds of bidding of the particular auction. It is noted that although FIG. 8A illustrates that the dedicated validation entities 838 as being separate from the enforcement server 840, it should be appreciated that the enforcement server 840 may itself include a module dedicated to generating a solution to the cryptographic puzzle and/or forming a consensus on the solution (e.g., one or more validation entities 838 that are integral with the enforcement server 840).

In another aspect, the enforcement server 840 may analyze an auction database 850 to determine whether any transactions compiled into a new block are associated with an auction that is presently being conducted. For example, a particular bidding entity 835b may provide, within the new block, multiple indications of bids or no-bids (e.g., of bidding actions) corresponding to respective multiple open auctions. To this end, the enforcement server 840 may extract, from the new block, one or more transactions identifying the particular bidding entity 835z and its indication(s) of respective bidding actions (e.g., bids or no-bids) for one or more auctions, and may update auction data or records stored in the auction database 850 with the bidding actions submitted by the particular bidding entity 835b.

Generally speaking, the indications of bids/no-bids and/or other auction information associated with the distributed ledger 832 may be stored in the auction database 850. For example, the auction database 850 may store information regarding the state of one or more open or in-progress auctions; respective submitted bidding actions; winning entities; statuses, terms, and other information corresponding to insurance policies that have been enacted based upon completed auctions; and the like. Although FIG. 8A depicts the auction database 850 as a part of the enforcement sever 840, in some embodiments, the auction database 850 may be maintained within the distributed ledger 832.

To support these and other aspects, the enforcement sever 840 may include a blockchain manager 845. The blockchain manager 845 may be a software program, engine, unit, and/or a module that is executed by one or more processors interconnected with the enforcement server 840. That is, the blockchain manager 845 may include a set of computer-executable instructions that is stored on one or more tangible, non-transitory computer-readable storage media or memories included in or accessible to the enforcement server 840.

In one embodiment, the blockchain manager 845 may compile a plurality of auction actions (e.g., bids or no bids) into a block, update the distributed ledger 832 to include a block, route auction data to one or more bidding entity computing systems or devices 835a-835n, and/or automatically determine a winning bid and award the respective opportunity to provide insurance to the entity that submitted the winning bid. In some embodiments, the blockchain manager 845 may provide authentication and/or authorization of bidding entities 835a-835n, and may secure auction data that is shared between bidding entities 835a-835n. Further, the blockchain manager 845 may provide the secure transfer or transmission of affinity group data (e.g., data that is descriptive of affinity group members, as a group and/or individually) to the winning bidding entity so that the winning bidding entity may generate and provide insurance policies for the affinity group. For example, the blockchain manager 845 may provide, to the winning bidding entity, contact information for one or more consumers associated with the affinity group, and/or other characteristics of particular affinity group members which may adjust premiums and/or other terms of respective insurance policies on a per-member basis (e.g., driving record, good student discount, total number of miles driven, age of primary driver, etc.). Additionally, the blockchain manager 845 may (e.g., in cooperation with the computing system of the winning bidding entity) update statuses, terms, claim data, payments, and other information corresponding to the enacted insurance policies for the affinity group.

According to certain aspects, an operator of the enforcement server 840 may interact with a management interface 848 to control aspects of the distributed ledger 832 and/or set control parameters associated with the blockchain manager 845. For example, a time period for which blocks are generated may be set via the management interface 848, a timing for pushing distributed ledger updates to the nodes may be set via the management interface 848, or a criteria for determining a winning bid may be set via the management interface 848.

According to certain aspects, one or more public devices 852 may access at least some of the data stored at the enforcement server 840 via a public interface 855. The public interface 855 may be a read-only interface that prevents the one or more public devices 852 from writing transactions to the distributed ledger 832. To this end, the one or more public devices 852 may be used, for example, to view data maintained within the distributed ledger 832, to view the status of one or more auctions associated with the distributed ledger 832, compile statistics regarding data maintained in the distributed ledger 832, and so on. For example, computing devices associated with bidding entities 835a-835n may access portions of the data stored at the enforcement server 840 via the public interface 855.

Figure 8B:
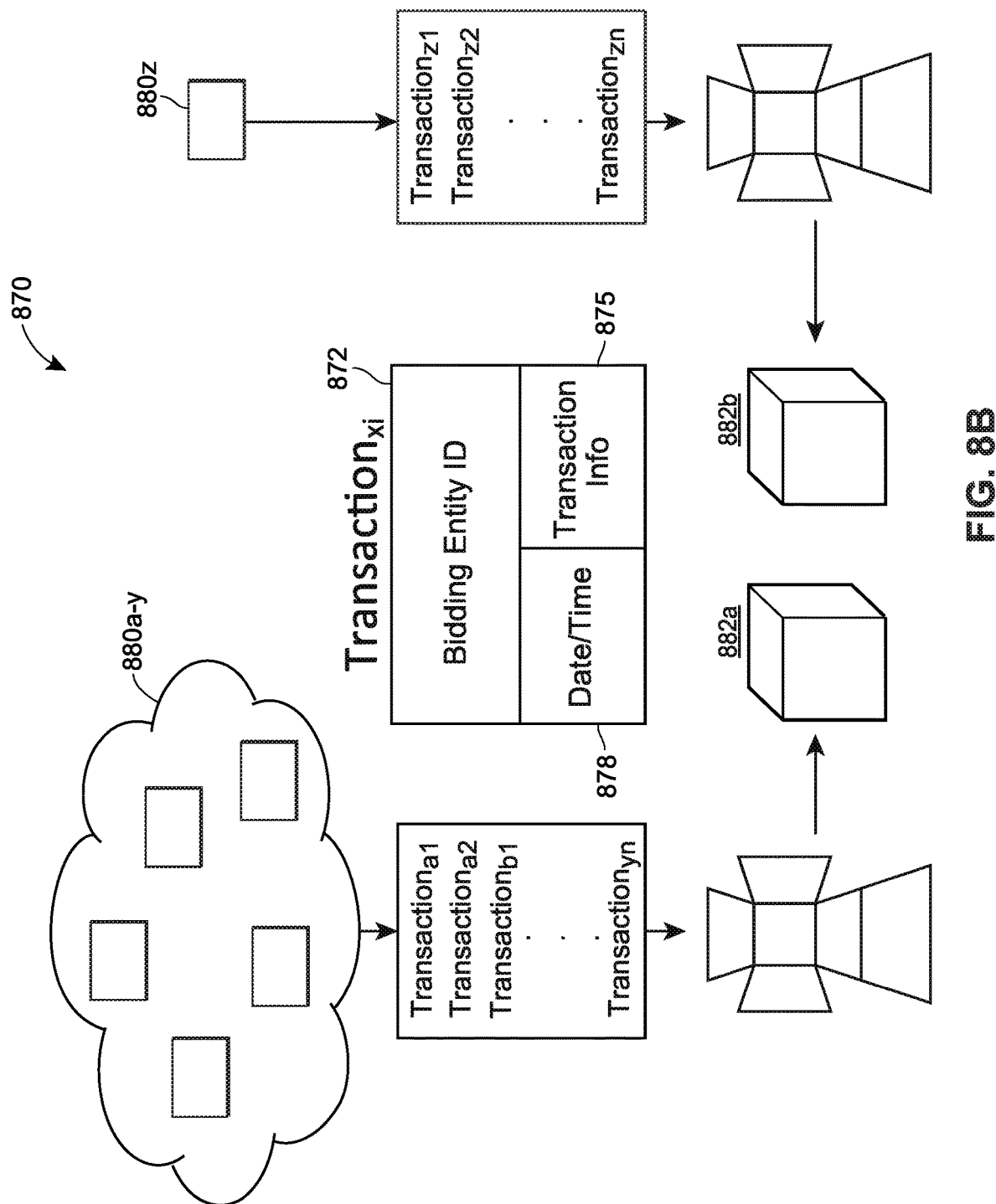
FIG. 8B illustrates an exemplary flow diagram with compiling pluralities of transactions into blocks.

Turning now to FIG. 8B, illustrated is an exemplary flow diagram 870 associated with compiling a plurality of transactions into blocks. In one embodiment, the flow diagram 870 may be executed in the blockchain environment 830 of FIG. 8A. As illustrated, each transaction xi may include several components. A first component may include an identification of a bidding entity 872. The bidding entity may be, for example, an insurance company, insurance provider, an insurance broker, etc. Another component of each transaction xi may be a transaction information component 875 associated with a timestamp 878. The transaction information component 875 may include an indication of a bid or bid amount that is put forth by the bidding entity 872 for a particular auctions, or an indication that the bidding entity 872 is not putting forth a bid for the particular auction. In some aspects, the bidding entity's identification 875 and the timestamp 878 may be viewed as a transaction header, whereas the transaction information 875 may be viewed as the transaction payload.

According to illustrated embodiments, a plurality of transactions may be compiled into a block. In one example scenario, a plurality of transactions generated by a plurality of bidding entities 880a-y may be compiled into a block 882a. For example, each of the plurality of computing devices or systems respectively corresponding to various bidding entities 880a-880y may transmit bids to an enforcement server (such as the enforcement server 840 as described with respect to FIG. 8A) for compilation into the block 882a. As such, in this example, each block 882a may correspond to one round of bidding, and/or a block 882a may correspond to the respective maximum bids (if any) of the bidding entities 880a-880y.

In another example, a particular bidding entity 880z compiles a plurality of transactions generated at the particular bidding entity 880z into a block 882b that only includes transactions associated with the particular bidding entity 880z. For instance, the various transactions included in the block 882b may respectively correspond to respective bids and/or respective no-bids of a plurality of auctions in which the bidding entity 880z is participating, and/or the block 882b may include respective indications of respective, maximum bid amounts for auctions in which the particular bidding entity 880z is participating. In this example, the particular bidding entity 880z may transmit, to the enforcement server 840, the generated block 882b for distribution to a plurality of validation entities 838 that attempt to solve a cryptographic puzzle based upon the header of the generated block 882b and/or form a consensus on one or more solutions corresponding to one or more auctions. The exemplary flow diagram 870 may include additional, fewer, or alternate actions, including those discussed elsewhere herein.

Figure 8C:
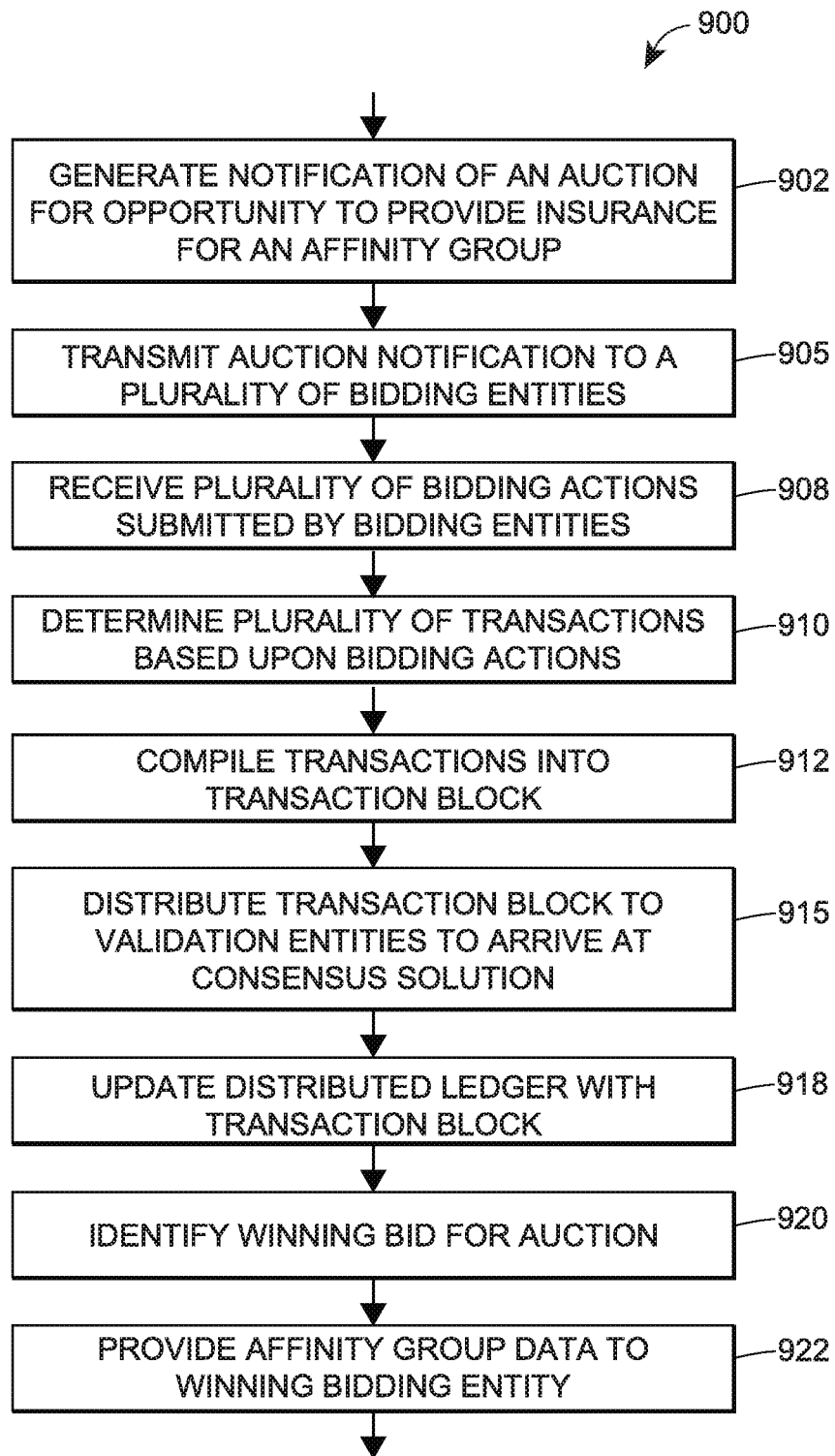
FIG. 8C includes a flow diagram of an exemplary computer-implemented method for auctioning insurance policies using a blockchain environment, according to one embodiment.

FIG. 8C includes a flow diagram of an exemplary computer-implemented method 900 of auctioning insurance policies using a blockchain environment. The method 900 may be executed within the blockchain environment 830 of FIG. 8A, and/or the method 900 may operate in conjunction with one or more portions of the flow diagram 870 of FIG. 8B. For example, at least a portion of the method 900 may be performed by the enforcement server 840. In some embodiments, at least a portion of the method 900 may be performed by the system 10 of FIG. 1 and/or by the computer system 300 of FIG. 2. Further, the method 900 may operate in conjunction with one or more portions of any one or more of the methods discussed with respect to FIGS. 3-7. The method 900 may include additional, less, or alternate actions, including those discussed elsewhere herein, although for clarity of discussion, and not for limitation purposes, the method 900 is discussed herein with simultaneous reference to FIGS. 1, 2, 8A, and 8C.

At a block 902, the method 900 may include generating a notification of an auction for an opportunity to provide insurance for an affinity group, determining a plurality of bidding entities. For example, an enforcement server 840 may generate the notification of an auction corresponding to an affinity group. At a block 905, the method 900 may include transmitting the notification of the auction corresponding to the affinity group to the plurality of bidding entities. The plurality of bidding entities may include one or more insurance providers, insurance brokers, insurance carriers, etc. (such as providers 16-1 to 16-N), and in one embodiment, the method 900 may include determining the plurality of bidding entities based upon one or more characteristics of the affinity group and/or one or more characteristics of the insurance providers, insurance brokers, insurance carriers, etc. The notification of the auction corresponding to the affinity group may be transmitted, for example, via one or more network interfaces of the enforcement server 840 and by using an electronic or communications network 842 to one or more computing devices and systems corresponding to the plurality of bidding entities (e.g., references 16-1 to 16-N).

In one example, the affinity group may comprise a group of persons each of who respectively desire to obtain insurance, such as auto insurance. In another example, the affinity group may exclude people or persons, and instead may comprise one or more products, services, and/or assets that may be provided for fractional-use and/or for fractional-ownership, and that are to be insured, such as a group of autonomous vehicles, a shared vehicle, etc. In one embodiment (not shown), the method 900 includes forming the affinity group based upon collected end-consumer data and/or based upon data that has been entered into insurance applications. In another embodiment, the affinity group is pre-defined by a third-party, such as a party that desires to procure insurance for a group of persons, products, services, and/or assets.

At a block 908, the method 900 may include receiving a plurality of bidding actions that have been submitted by at least some of the plurality of bidding entities in response to the notification of the auction of the opportunity to provide insurance for the affinity group. The plurality of bidding actions may include a respective bidding action submitted by each bidding entity, where the respective bidding action indicates, for example, a bid amount (e.g., a monetary bid amount) or a no-bid. The plurality of bidding actions may be received via the one or more network interfaces and by using an electronic or communications network, in one embodiment.

At a block 910, the method 900 may include determining or generating a plurality of transactions based upon the plurality of bidding actions. For example, the blockchain manager 845 may determine or generate the plurality of transactions based upon the plurality of bidding actions. Each transaction may include an indication of a specific bidding entity (e.g., an identification, identifier, or ID of the bidding entity), an indication of a particular auction, an indication of a bidding action for the particular auction, and a timestamp or other indication of a time at which the bidding action was generated. In some embodiments, a single transaction may include indications of multiple bidding actions (e.g., for a same auction and/or for different auctions) and their respective timestamps. In some embodiments, a single transaction may include indications of multiple bidding entities and their respective bidding actions and timestamps. Other embodiments of determining or generating transactions may be possible.

At a block 912, the method 900 may include compiling or bundling the plurality of transactions corresponding to the plurality of bidding actions into a block of transactions, e.g., into a transaction block, e.g., a transaction block 872. In one embodiment, the blockchain manager 848 of the enforcement server 840 may compile or bundle the plurality of transactions into a block of transactions. As previously discussed, in some implementations, each transaction within a transaction block may be assigned a hash value, and the plurality of transaction hash values may be combined to generate a hash value for the transaction block. A maximum number of transactions which may be included in a block may be pre-defined, e.g., via the management interface 848 of the enforcement server 840. Additionally or alternatively, a periodicity of generation of transaction blocks, a time period for which transaction blocks are generated, and/or an elapsed time interval between the generation of subsequent transaction blocks may be defined, e.g., via the management interface 848 of the enforcement server 840. The newly created block of transactions may be stored in the auction database 850, in one embodiment.

In one embodiment (not shown), the method 900 may include chaining or linking the newly generated block of transactions to a blockchain that comprises one or more previously generated transaction blocks. In these embodiments, the plurality of block hash values may be combined to generate a hash value for the entire blockchain. The blockchain including the newly-linked transaction block may be maintained or stored in the auction database 850, for example.

At a block 915, the method 900 may include distributing the block of transactions to one or more validation entities (e.g., one or more validation entities 838) to form a consensus on a solution for the newly generated transaction block, where the solution may include a highest bid for the newly generated transaction block. In one exemplary implementation, at least one of the one or more validation entities 838 may be included in the enforcement server 840, and/or at least one of the one or more validation entities 838 may be accessed via the network(s) 842.

As previously discussed, the one or more validation entities 838 may solve the cryptographic puzzle associated with the block of transactions (e.g., by utilizing the hash values associated with the transactions and with the block), and/or may form a consensus on a solution for the block. In embodiments in which the newly generated transaction block is chained or linked to a blockchain, the one or more validation entities may solve the cryptographic puzzle associated with the newly generated block by utilizing the hash values associated with the transactions, the block, and the blockchain, and/or may form a consensus on a solution for the blockchain. The solution may comprise, for example, a highest bid included in the transaction block for the auction corresponding to the affinity group. The highest bid included in the transaction block may be the highest bid of a particular round of bidding or the highest bid of multiple rounds of bidding, for example.

At a block 918, the method 900 may include updating a plurality of copies of a distributed ledger (e.g., the distributed ledger 832) with the newly generated transaction block having the solution determined by consensus. In one embodiment, upon reaching consensus on the newly generated transaction block (block 915), the plurality of copies of a distributed ledger may be updated by pushing or transmitting the newly generated transaction block to all nodes (e.g., the nodes 835) at which copies of the distributed ledger 832 are stored, and each node may chain or link the newly created transaction block to an existing blockchain stored at the node (if any). For example, the transaction block may be pushed out to each of the respective computing devices or systems of the plurality of bidding entities 16-1 to 16-N, e.g., to each node, so that the respective computing devices or systems of the plurality of bidding entities may each maintain an identical copy of the updated distributed ledger 832.

At a block 920, the method 900 may include identifying, based upon the updated distributed ledger, a winning bid for the auction corresponding to the affinity group. For example, identifying the winning bid for the auction corresponding to the affinity group based upon the updated distributed ledger may comprise reaching consensus on a solution for the entire blockchain, including the newly linked transaction block, by the one or more validation entities 838. Identifying the winning bid for the auction may be based upon the expiration of a time period or interval, a completion of a number of elapsed bidding rounds, a minimum number and/or a maximum number of received bids, and/or any other desired or suitable criteria. In one embodiment, the blocks 908-918 may be repeated multiple times prior to the identification of the winning bid for the auction corresponding to the affinity group. In some scenarios, the block 920 may be integral with the blocks 912-918, for example, during a final round of bidding for the auction corresponding to the affinity group.

At a block 922, the method 900 may include providing, to the particular bidding entity data that submitted the winning bid, data that is descriptive of group members of the affinity group for use by the particular bidding entity in generating one or more insurance policies for the affinity group, thereby providing lower cost insurance and/or insurance that is more reflective of actual risk, or lack thereof, to a set of consumers associated with the particular affinity group. For example, data that is common for all group members of the affinity group may be provided to the winning bidding entity, and/or data that is different between at least two group members of the affinity group may be provided to the winning bidding entity. In one embodiment, providing the descriptive data of the group members may include securing the descriptive data and transmitting the secured descriptive data to the winning bidding entity.

XI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "one embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of automatically obtaining and/or maintaining insurance coverage through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer system, comprising:
   one or more persistent memories storing an auction database;
   one or more communication interfaces configured to communicate with remote devices via one or more networks; and
   a blockchain manager unit comprising computer-executable instructions that are stored on one or more non-transitory, computer-readable storage media and that, when executed by one or more processors, cause the system to:
   compile a plurality of transactions into a block of transactions, the plurality of transactions corresponding to a plurality of bidding actions submitted by a plurality of bidding entities for an auction of an opportunity to provide insurance for an affinity group, and the plurality of bidding actions received at the system via the one or more communication interfaces;
   update, via the one or more communication interfaces, a plurality of copies of a distributed ledger with the block of transactions, the plurality of copies of the distributed ledger stored in a plurality of computing devices respectively corresponding to the plurality of bidding entities;
   identify a winning bid for the auction corresponding to the affinity group based upon multiple updates to the distributed ledger, the multiple updates corresponding to multiple blocks of transactions;
   store, in the auction database, an indication of the winning bid for the auction corresponding to the affinity group and an indication of a particular bidding entity that submitted the winning bid; and
   provide, to a computing device corresponding to the particular bidding entity that submitted the winning bid, data descriptive of group members of the affinity group for use by the particular bidding entity in generating one or more insurance policies for the affinity group.

2. The computer system of claim 1, wherein each bidding action included in the plurality of bidding actions includes one of a respective bid amount or a respective indication of a no-bid.

3. The computer system of claim 1, wherein the block of transactions includes respective indications of (i) a first transaction corresponding to a respective bidding action submitted by a first bidding entity in response to the auction corresponding to the affinity group, and (ii) a second transaction corresponding to a respective bidding action submitted by a second bidding entity in response to the auction corresponding to the affinity group.

4. The computer system of claim 1, wherein the block of transactions includes respective indications of (i) a first transaction corresponding to a bidding action submitted by a specific bidding entity in response to the auction corresponding to the affinity group, and (ii) a second transaction corresponding to a bidding action submitted by the specific bidding entity in response to another auction corresponding to another affinity group.

5. The computer system of claim 1, wherein the block of transactions corresponds to a single round of bidding for the auction corresponding to the affinity group.

6. The computer system of claim 1, wherein membership in the affinity group is pre-defined by a third-party.

7. The computer system of claim 1, wherein the affinity group excludes people.

8. The computer system of claim 1, wherein:
the block of transactions is a first block of transactions;
the auction database stores one or more other blocks of transactions; and
the blockchain manager unit further causes the system to chain first block of transactions to the one or more other blocks of transactions and store the chained blocks of transactions in the auction database.

9. The computer system of claim 1, wherein the data descriptive of the group members of the affinity group is securely transferred, via the one or more communications interfaces, to a computing device corresponding to the particular bidding entity that submitted the winning bid.

10. The computer system of claim 1, wherein the blockchain manager unit is included in an enforcement server, and the enforcement server further comprises a management interface unit configured to control aspects of at least one of the distributed ledger or the blockchain manager.

11. The computer system of claim 1, wherein the blockchain manager unit is included in an enforcement server, and at least one of the one or more validation entities is included in the enforcement server.

12. The computer system of claim 1, wherein the blockchain manager unit is coupled to a public interface configured to allow read-only access to at least some of the information stored in the auction database.

13. The computer system of claim 1, wherein a set of bidding entities to which the auction of the opportunity to provide insurance for the affinity group is offered is determined based upon one or more characteristics shared by group members of the affinity group, and wherein the plurality of bidding entities is included in the set of bidding entities.

* * * * *